United States Patent
Lim et al.

(10) Patent No.: US 10,331,211 B2
(45) Date of Patent: Jun. 25, 2019

(54) DEVICE AND METHOD FOR PROVIDING TACTILE SENSATION

(71) Applicant: SAMSUNG ELECTRONICS CO., LTD, Suwon-si (KR)

(72) Inventors: Soo Chul Lim, Suwon-si (KR); Joonah Park, Suwon-si (KR); Hyun Jeong Lee, Suwon-si (KR); Seung Ju Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 287 days.

(21) Appl. No.: 15/120,770

(22) PCT Filed: Jun. 12, 2014

(86) PCT No.: PCT/KR2014/005140
§ 371 (c)(1),
(2) Date: Aug. 23, 2016

(87) PCT Pub. No.: WO2015/129964
PCT Pub. Date: Sep. 3, 2015

(65) Prior Publication Data
US 2017/0060239 A1     Mar. 2, 2017

(30) Foreign Application Priority Data

Feb. 28, 2014 (KR) .................... 10-2014-0024433

(51) Int. Cl.
*G06F 3/01*          (2006.01)
*G06F 3/041*        (2006.01)
(Continued)

(52) U.S. Cl.
CPC .............. *G06F 3/016* (2013.01); *G06F 3/041* (2013.01); *G06F 3/046* (2013.01); *G06F 3/0488* (2013.01);
(Continued)

(58) Field of Classification Search
CPC .......... G06F 3/016; G06F 3/041; G06F 3/046; G06F 3/0488; G06F 3/04886
(Continued)

(56) References Cited

U.S. PATENT DOCUMENTS

| 8,279,193 B1 | 10/2012 | Birnbaum et al. |
| 9,395,818 B2 * | 7/2016 | Schuckle ................ G06F 3/016 |

(Continued)

FOREIGN PATENT DOCUMENTS

| JP | 2010-515228 A | 5/2010 |
| JP | 2011-248884 A | 12/2011 |

(Continued)

OTHER PUBLICATIONS

Mallinckrodt, E. et al., "Perception by the skin of electrically induced vibrations," Science, 1953 (2 pages).
(Continued)

*Primary Examiner* — Prabodh M Dharia
(74) *Attorney, Agent, or Firm* — NSIP Law

(57) ABSTRACT

A device and a method for providing tactile sensation by using electrostatic force between an electrode and a user. The device for providing tactile sensation includes a plurality of electrodes arranged on a substrate, and a dielectric substance layer formed on the substrate and the electrodes, wherein the electrodes electrify the dielectric substance layer with an electric charge according to a driving voltage, so as to generate electrostatic force that provides tactile stimuli to a user who comes into contact with the dielectric substance layer.

23 Claims, 24 Drawing Sheets

(51) Int. Cl.
*G06F 3/046* (2006.01)
*G06F 3/0488* (2013.01)

(52) U.S. Cl.
CPC .... *G06F 3/04886* (2013.01); *G06F 2203/014* (2013.01); *G06F 2203/04104* (2013.01); *G06F 2203/04808* (2013.01)

(58) Field of Classification Search
USPC ................................ 345/156–184; 340/407.2
See application file for complete search history.

(56) References Cited

U.S. PATENT DOCUMENTS

| | | | | |
|---|---|---|---|---|
| 2008/0129705 | A1* | 6/2008 | Kim | G06F 3/016 345/174 |
| 2008/0218488 | A1* | 9/2008 | Yang | G09G 3/20 345/173 |
| 2009/0079550 | A1 | 3/2009 | Makinen et al. | |
| 2011/0285667 | A1* | 11/2011 | Poupyrev | G06F 3/016 345/174 |
| 2012/0098788 | A1* | 4/2012 | Sekiguchi | G06F 3/044 345/174 |
| 2012/0268386 | A1* | 10/2012 | Karamath | G06F 3/016 345/173 |
| 2012/0280920 | A1* | 11/2012 | Jackson | G06F 3/016 345/173 |
| 2012/0327006 | A1* | 12/2012 | Israr | G06F 3/016 345/173 |
| 2013/0044049 | A1* | 2/2013 | Biggs | G06F 3/016 345/156 |
| 2014/0225848 | A1* | 8/2014 | Ogura | G06F 3/041 345/173 |
| 2014/0340210 | A1* | 11/2014 | Wakuda | G06F 3/041 340/407.2 |
| 2015/0103015 | A1* | 4/2015 | Berglund | G06F 3/016 345/173 |
| 2015/0323995 | A1* | 11/2015 | Lim | G06F 3/0416 345/174 |
| 2015/0370372 | A1* | 12/2015 | Withers | G06F 3/044 345/174 |

FOREIGN PATENT DOCUMENTS

| | | |
|---|---|---|
| JP | 2012-69042 A | 4/2012 |
| JP | 2012-226481 A | 11/2012 |
| KR | 10-1999-018186 A | 3/1999 |
| KR | 10-2008-0049590 | 6/2008 |
| KR | 10-2011-0001839 A | 1/2011 |
| KR | 10-2011-0018429 A | 2/2011 |
| KR | 10-2011-0042299 A | 4/2011 |
| KR | 10-2011-0110296 A | 10/2011 |
| KR | 10-1416722 B1 | 7/2014 |

OTHER PUBLICATIONS

International Search Report issued in counterpart International Application No. PCT/KR2014/005140 dated Nov. 24, 2014 (4 pages).

* cited by examiner

DEVICE AND METHOD FOR PROVIDING TACTILE SENSATION

CROSS REFERENCE TO RELATED APPLICATION(S)

This application is a National Phase entry of PCT Application No. PCT/KR2014/005140, filed on Jun. 12, 2014, which claims the benefit of Korean Patent Application No. 10-2014-0024433 filed Feb. 28, 2014, in the Korean Intellectual Property Office, the entire disclosure of which is incorporated herein by reference for all purposes.

BACKGROUND

Technical Field

Example embodiments relate to an apparatus and method for providing tactile information to a user.

Background Art

Technology for providing tactile information may refer to technology for feeding back information to a user via a hand of the user.

A conventional mobile terminal may feedback an alarm to the user through vibrating the entire mobile terminal.

However, when tactile information is feedback through vibrating the entire mobile terminal, a limit lies therein in that transmitting a localized vibration is difficult because a vibration is provided to an entire hand holding the mobile terminal.

Accordingly, technology for feeding back tactile information has been developed through transmitting a vibration stimulus to the user, using electricity.

However, due to a high voltage used in a conventional scheme for transmitting a vibration stimulus using electricity, the user may receive an extreme electric stimulus, and applying the conventional scheme to a small sized mobile terminal may be difficult.

DISCLOSURE OF INVENTION

Technical Solutions

The foregoing and/or other aspects are achieved by providing an apparatus for providing tactile information, the apparatus including a plurality of electrodes disposed on a substrate, and a dielectric substance layer formed on the substrate and the plurality of electrodes, wherein the plurality of electrodes generates an electrostatic force that provides tactile information to a user making contact with the dielectric substance layer by applying an electric charge to the dielectric substance layer based on a driving voltage.

The plurality of electrodes may control an intensity, an amplitude, and a duration of a vibration by changing an electrostatic force based on a frequency, an amplitude, and an input duration of a driving voltage.

The plurality of electrodes may provide differing tactile information to the user based on a position at which the user makes contact with the dielectric substance layer by applying an electric charge to a dielectric substance layer based on a plurality of driving voltages corresponding to positions of electrodes.

The plurality of electrodes may be disposed in a form of an array on the substrate.

The dielectric substance layer may be composed of at least one selected from a group of strontium titanate (SrTiO$_3$), an SrTiO$_3$ compound, barium titanate (BaTiO$_3$), a BaTiO$_3$ compound, hafnium oxide (HfO$_2$), aluminum oxide (Al$_2$O$_3$), and titanium dioxide (TiO$_2$).

The foregoing and/or other aspects are achieved by providing an apparatus for providing tactile information, the apparatus including a tactile information providing area and a sensing area, wherein the tactile information providing area includes a dielectric substance layer, and first electrodes to generate an electrostatic force that provides tactile information to a user making contact with a dielectric substance layer by applying an electric charge to the dielectric substance layer based on a driving voltage, and the sensing area includes a second electrode to output a current, a third electrode to receive the current output by the second electrode, and a blocking layer to block transmission of the current to the tactile information providing area, wherein the first electrodes apply the electric charge to the dielectric substance layer based on the driving voltage determined based on a position at which the user makes contact sensed by a difference between the current output by the second electrode and the current received by the third electrode.

The foregoing and/or other aspects are achieved by providing an apparatus for providing tactile information, the apparatus including a tactile information providing area and a sensing area, wherein the tactile information providing area includes a dielectric substance layer, and first electrodes to generate an electrostatic force that provides tactile information to a user making contact with a dielectric substance layer by applying an electric charge to the dielectric substance layer based on a driving voltage, and the sensing area includes a second electrode to output a current, a third electrode to receive the current output by the second electrode, an elastic layer, disposed between the second electrode and the third electrode, to change a distance between the second electrode and the third electrode through a transformation based on an external pressure, and a blocking layer to block transmission of the current to the tactile information providing area, wherein the first electrodes apply the electric charge to the dielectric substance layer based on the driving voltage determined based on at least one of a position at which the user makes contact sensed by the distance between the second electrode and the third electrode and a magnitude of the external pressure.

The apparatus providing the tactile information may further include a display to display at least one object, wherein the first electrodes provide the tactile information to the user by applying the electric charge to the dielectric substance layer based on a driving voltage determined based on at least one of the position at which the user makes contact, a position at which the object is displayed on the display, and information about the object.

The first electrodes may provide the tactile information to the user by applying the electric charge to the dielectric substance layer based on a driving voltage determined based on a texture of the object corresponding to the position at which the user makes contact on the display.

The first electrodes may provide the tactile information to the user by applying the electric charge to the dielectric substance layer based on a driving voltage determined based on a type of the object corresponding to the position at which the user makes contact on the display.

When the position at which the user makes contact corresponds to at least one predetermined position at which tactile information is provided, the first electrodes may provide the tactile information to the user by applying the electric charge to the dielectric substance layer.

The foregoing and/or other aspects are achieved by providing a method of providing tactile information, the method including sensing a position at which a user makes contact with a dielectric substance layer using a sensing area, providing a driving voltage to an electrode most adjacent to the sensed position of the user, and applying, by the electrode, an electric charge to the dielectric substance layer based on the driving voltage, and generating an electrostatic force that provides tactile information to the user making contact with the dielectric layer.

The foregoing and/or other aspects are achieved by providing an apparatus for providing tactile information, the apparatus including a dielectric substance layer, electrodes to generate an electrostatic force that provides tactile information to a user making contact with the dielectric substance layer by applying an electric charge to the dielectric substance layer based on a driving voltage, and ground areas, disposed amongst the electrodes, to ground the electric charge applied to the dielectric substance layer by the electrodes.

BEST MODE FOR CARRYING OUT THE INVENTION

Hereinafter, embodiments will be described in detail with reference to the accompanying drawings.

Figure 1:
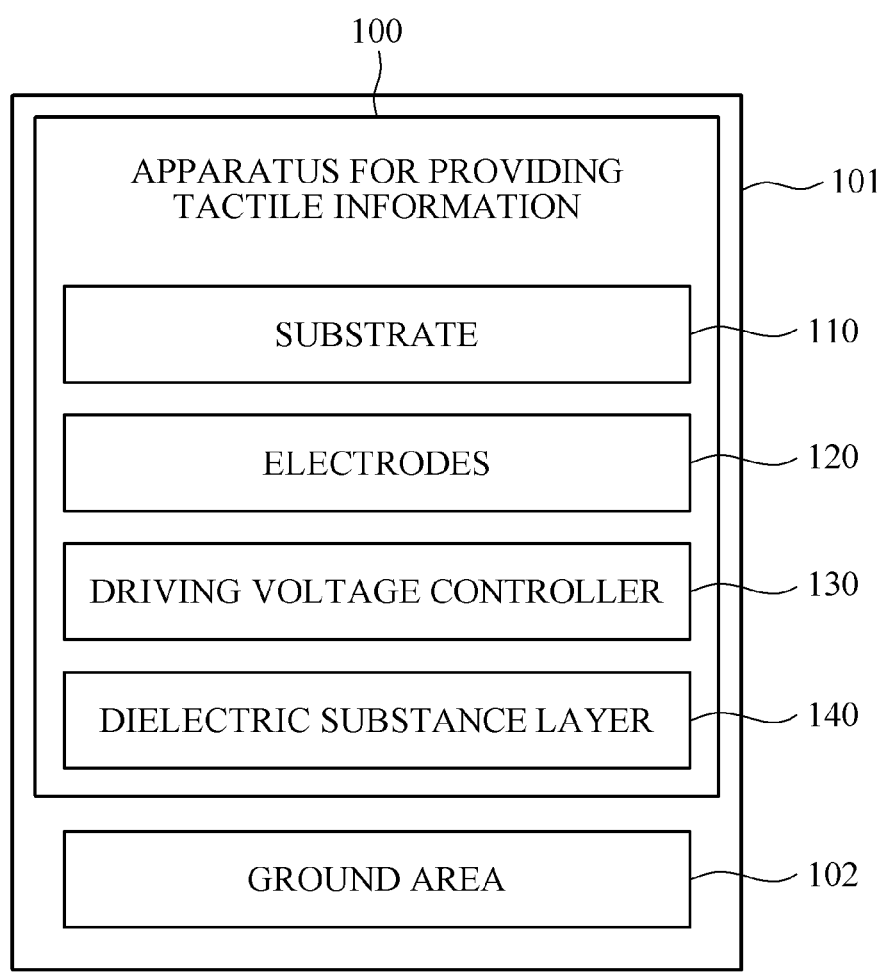
FIG. 1 illustrates a configuration of an apparatus for providing tactile information according to example embodiments.

FIG. 1 illustrates a configuration of an apparatus 100 for providing tactile information according to example embodiments.

Referring to FIG. 1, the apparatus 100 for providing the tactile information includes a substrate 110, a plurality of electrodes 120, a driving voltage controller 130, a dielectric substance layer 140, and a ground area 102.

The apparatus 100 for providing the tactile information is bonded onto a display, and provides tactile information to a user making contact with the display, based on information displayed on the display. Also, the apparatus 100 for providing the tactile information is bonded onto an object, for example, a desk, and informs a user of a predetermined position of the bonded object via the tactile information. The apparatus 100 for providing the tactile information is bonded onto an opaque apparatus for a touch input, and informs a user of a button or an input device of the bonded opaque apparatus for the touch input via the tactile information.

The substrate 110 is bonded onto a display or a surface of an object for providing tactile information to a user. For example, the substrate 110 bonded onto the display may be formed by a transparent object with a high transmittance, and may not prevent a user from recognizing content of the display due to the substrate 110.

The substrate 110 bonded onto a surface of an object 101 such as a desk, an opaque touch screen, and a device are formed in a material corresponding to a color and a texture of the surface of the object or the device onto which the substrate 110 is bonded.

The plurality of electrodes 120 is disposed on the substrate 110, and applies an electric charge to the dielectric substance layer 140 based on a driving voltage input. The plurality of electrodes 120 generates an electrostatic force that provides the tactile information to the user making contact with the dielectric substance layer 140 by applying the electric charge to the dielectric substance layer 140. The plurality of electrodes 120 controls an intensity, an amplitude, and a duration of a vibration in the tactile information by changing the electric charge applied to the dielectric substance layer 140 based on a frequency, an amplitude, and an input duration of a driving voltage.

A process of generating the electrostatic force will be described in detail with reference to FIG. 1.

For example, the plurality of electrodes 120 may be formed in a transparent material such as indium tin oxide (ITO), graphene, a carbon nanotube (CNT), and a silver nano wire, and may not prevent the user from recognizing content of the display due to the plurality of electrodes 120.

The plurality of electrodes 120 is disposed in a form of an array on the substrate 110, and operates independently.

The driving voltage controller 130 independently controls a driving voltage that is applied to a plurality of electrodes. For example, the driving voltage controller 130 inputs the driving voltage to the plurality of electrodes 120 in a form of a modulated voltage.

The driving voltage controller 130 controls the driving voltage input to the plurality of electrodes 120 differently based on positions of the plurality of electrodes 120. The plurality of electrodes 120 generates electrostatic forces differing based on the positions of the plurality of electrodes 120 by applying an electric charge to the dielectric substance layer 140 based on the driving voltage controlled by the driving voltage controller 130.

The tactile information provided to the user is determined based on an electrostatic force generated by the plurality of electrodes 120 closest to a position at which the user contacts the dielectric substance layer 140 because the tactile information provided to the user corresponds to the electrostatic force.

The user is provided with tactile information differing based on the position at which the user contacts the dielectric substance layer 140 by controlling the driving voltage input to the plurality of electrodes 120 by the driving voltage controller 130.

A process of the user being provided with the tactile information differing based on the position at which the user contacts the dielectric substance layer 140 will be described with reference to FIGS. 5 through 10.

The dielectric substance layer 140 is formed on the plurality of electrodes 120, and refers to a configuration with which the user makes contact.

The dielectric substance layer 140 includes one of a compound having a high permittivity and an organic material having a high permittivity. For example, the compound having the high permittivity may be composed of at least one selected from a group of strontium titanate ($SrTiO_3$), an $SrTiO_3$ compound, barium titanate ($BaTiO_3$), a $BaTiO_3$ compound, hafnium oxide ($HfO_2$), aluminum oxide ($Al_2O_3$), titanium dioxide ($TiO_2$), and zirconium dioxide ($ZrO_2$).

The ground area 102, disposed on a display onto which the apparatus 100 for providing the tactile information is bonded or on one end of an object 101, grounds an electric charge applied to the dielectric substance layer 140. For example, when a portion of a skin of the user making contact with the dielectric substance layer 140 contacts the ground area 102, an electrostatic force may increase in response to the electric charge applied to the dielectric substance layer 140 moving to the skin of the user, and therefore a higher level of tactile information may be provided to the user.

Figure 2:
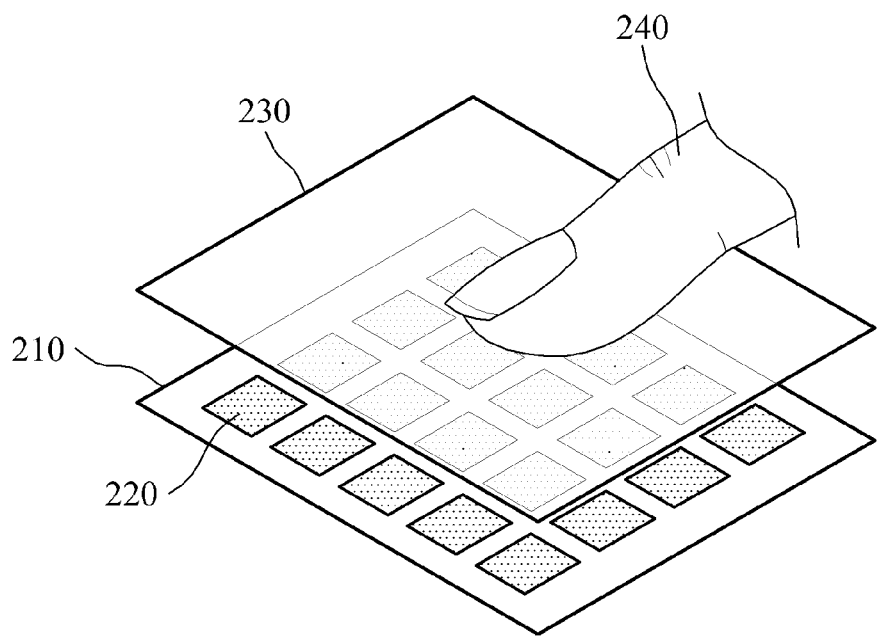
FIG. 2 illustrates an example of an apparatus for providing tactile information according to example embodiments.

FIG. 2 illustrates an example of the apparatus 100 for providing tactile information according to example embodiments.

In the apparatus 100 for providing the tactile information, a plurality of electrodes 220 is disposed, in a form of an array, on a substrate 210 formed in a transparent material as shown in FIG. 2. Also, a transparent dielectric substance layer 230 is formed on the substrate 210 on which the plurality of electrodes 220 is disposed.

When a user 240 contacts the dielectric substance layer 230 adjacent to the plurality of electrodes 220 to which a driving voltage is input, an electrostatic force between the plurality of electrodes 220 and the user 240 is generated, and tactile information is provided to the user 240.

The apparatus 100 for providing the tactile information inputs differing driving voltages to the plurality of electrodes 220 disposed in the form of the array, and provides tactile information differing based on positions of the plurality of electrodes 220 to users making contact with the dielectric substance layer 230.

Figure 3:
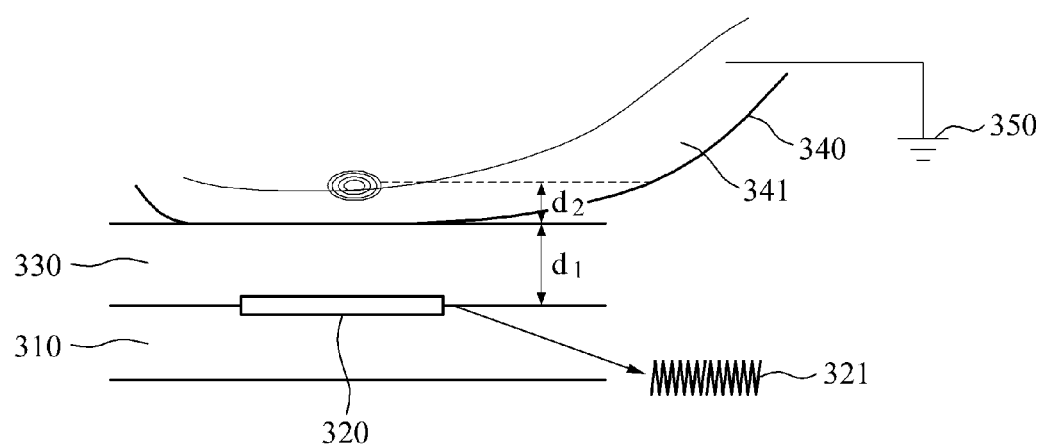
FIG. 3 illustrates an example in which an apparatus for providing tactile information provides tactile information according to example embodiments.

FIG. 3 illustrates an example in which an apparatus 100 for providing tactile information provides tactile information according to example embodiments.

The apparatus 100 for providing the tactile information inputs a driving voltage 321 to at least one electrode 320 of electrodes disposed on a substrate 310. A user 340 contacts a dielectric substance layer 330 formed on the electrode 320.

The electrode 320 applies an electric charge to the dielectric substance layer 330 disposed between the electrode 320 and a skin 341 of the user 340. The electric charge applied to the dielectric substance layer 330 is discharged via the skin 341 of the user 340 making contact with a ground area 350.

When the apparatus 100 for providing the tactile information changes the driving voltage 321 input to the electrode 320, an electrostatic force may be generated and tactile information may be provided to the user 340. The apparatus 100 for providing the tactile information inputs the driving voltage 321 in a form of a modulated voltage. Also, a type of the tactile information provided to the user 340 by the apparatus 100 for providing the tactile information is a vibration based on the driving voltage 321.

For example, the electrostatic force $F_E(t)$ generated in the apparatus 100 for providing the tactile information is calculated based on Equation 1.

$$F_E(t) = \frac{1}{2} \frac{1}{(d_1 + d_2)(1/C_1 + 1/C_2)} \{V(t)\}^2 \quad \text{[Equation 1]}$$
$$= \frac{1}{2} \frac{A}{(d_1 + d_2)(d_1/\varepsilon_1 + d_2/\varepsilon_2)} \{V(t)\}^2$$

In Equation 1, $d_1$ denotes a thickness of the dielectric substance layer 330 disposed between the electrode 320 and the user 340, $\varepsilon_1$ denotes a permittivity of the dielectric substance layer 330, $d_2$ denotes a thickness of a stratum corneum of the skin 341, and $\varepsilon_2$ denotes a permittivity of the skin 341.

Figure 4:
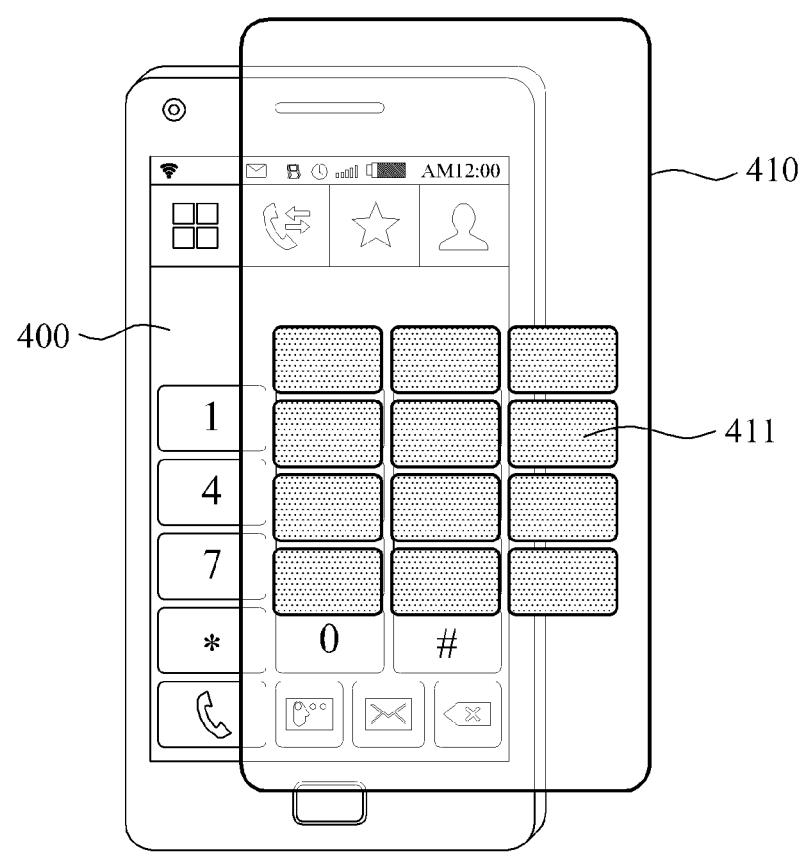
FIG. 4 illustrates an example in which an apparatus for providing tactile information is bonded onto a display according to example embodiments.

FIG. 4 illustrates an example in which an apparatus 400 for providing tactile information is bonded onto a display according to example embodiments.

The apparatus 400 for providing the tactile information is bonded onto the display of a mobile device as shown in FIG. 4.

A substrate and a dielectric substance layer 410 of the apparatus 400 for providing the tactile information may be formed in a transparent material having a transparency to a degree at which a user may identify content of the display as shown in FIG. 4, and may not prevent the user from recognizing the content of the display due to the apparatus 400 for providing the tactile information.

The apparatus 400 for providing the tactile information includes a plurality of electrodes 411 of a position and a size corresponding to a position and a size of an icon or a number plate displayed by the display.

When the user allows a finger or another body portion to make contact with the apparatus 400 for providing the tactile information in order to select the icon or the number plate, the apparatus 400 for providing the tactile information generates an electrostatic force on the finger or the other body portion of the user making contact using the plurality of electrodes 411.

The user provided with the tactile information generated by the electrostatic force recognizes that the user selects the icon or the number plate when the tactile information is provided to the user through the generated electrostatic force.

The apparatus 400 for providing the tactile information enables the user to recognize that the user selects the icon or the number plate without viewing the finger of the user by providing the tactile information to the user selecting the icon or the number plate.

The plurality of electrodes 411 operates independently, thereby providing differing forms of tactile information to the user.

An operation of providing the differing forms of tactile information to the user based on positions of the plurality of electrodes 411 will be discussed in detail with reference to FIGS. 5 through 7.

The apparatus 400 for providing the tactile information changes a type of tactile information provided to the user, based on a type of command to be input to the display, for example, zooming in or zooming out of an image displayed on the display. The user compares the type of tactile information sensed by the user and the command input by the user, and determines whether an input device of the display or the apparatus 400 for providing the tactile information precisely recognizes the command input by the user.

Also, the apparatus 400 for providing the tactile information changes the type of tactile information provided to the user based on whether the finger of the user making contact with the apparatus 400 for providing the tactile information moves.

Figure 5:
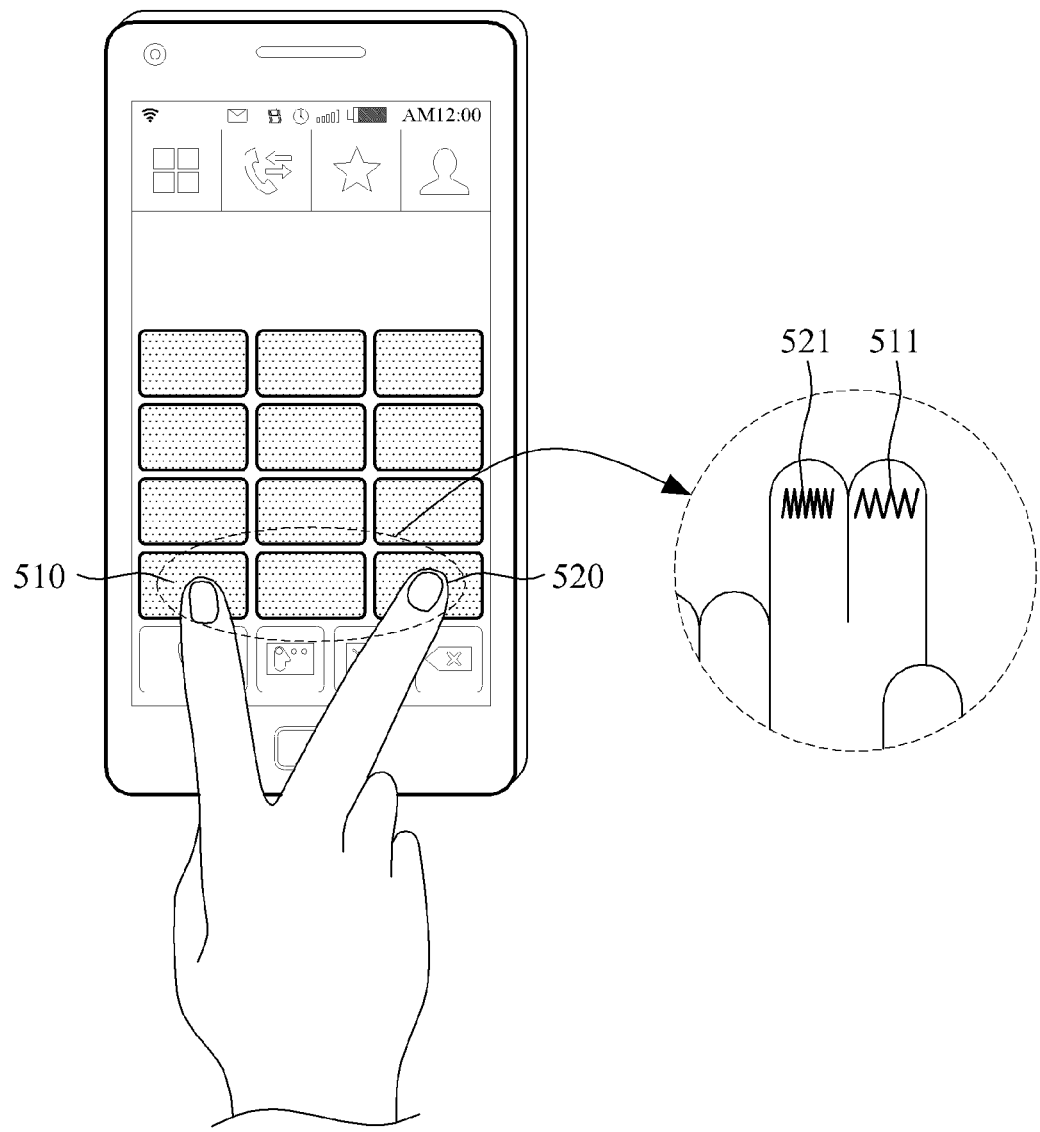
FIG. 5 illustrates an example in which an apparatus for providing tactile information provides tactile information differing based on a position of a finger of a user according to example embodiments.

FIG. 5 illustrates an example in which an apparatus for providing tactile information provides tactile information differing based on a position of a finger of a user according to example embodiments.

Referring to FIG. 5, the apparatus for providing the tactile information inputs differing driving voltages to an electrode 510 and an electrode 520, respectively.

The electrode 510 generates an electrostatic force based on a driving voltage input, and provides tactile information 511 to an index finger of a user. The electrode 520 generates an electrostatic force based on a driving voltage input, and provides tactile information 521 to a middle finger of the user.

The tactile information 511 and the tactile information 512 may differ in a frequency or an intensity of a vibration as shown in FIG. 5.

The user recognizes that a vibration sensed by the index finger differs from a vibration sensed by the middle finger, and recognize that different buttons are pressed by the index finger and the middle finger, respectively.

Figure 6:
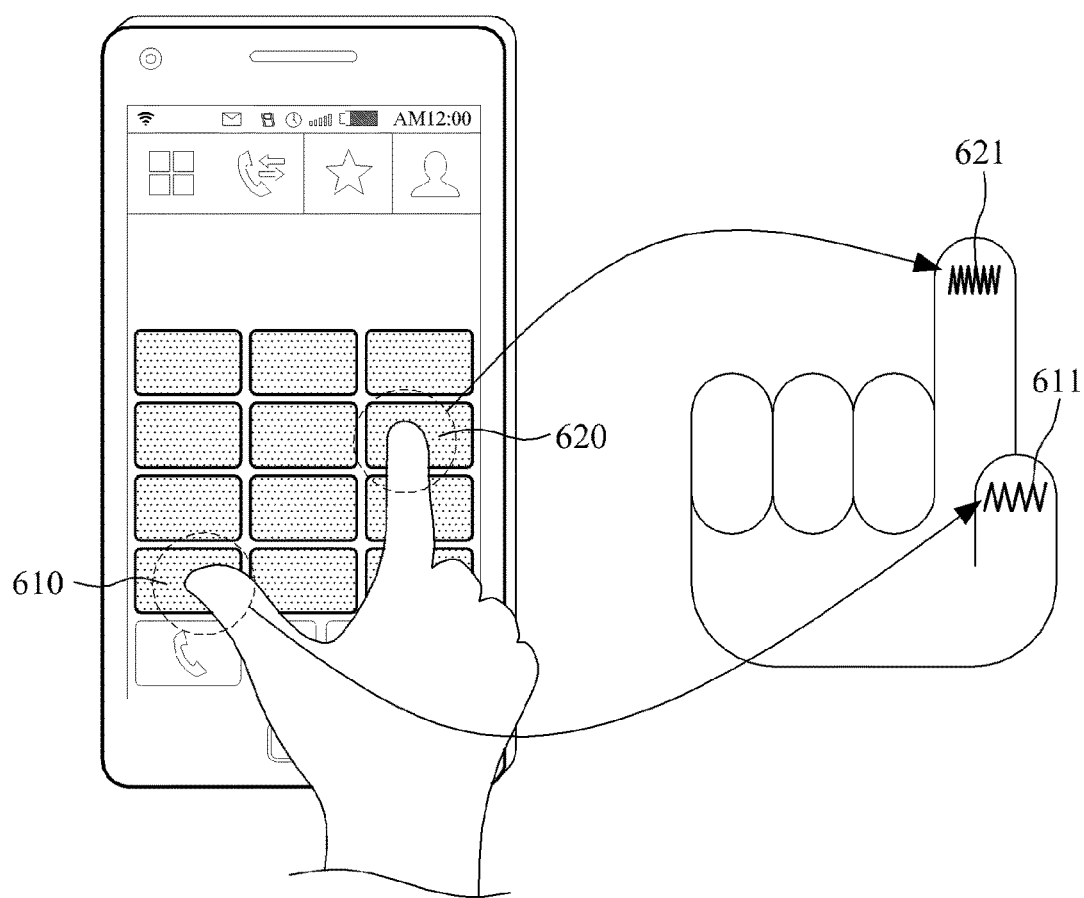
FIG. 6 illustrates another example in which an apparatus for providing tactile information provides tactile information differing based on a position of a finger of a user according to example embodiments.

FIG. 6 illustrates another example in which an apparatus for providing tactile information provides tactile information differing based on a position of a finger of a user according to example embodiments.

Referring to FIG. 6, the apparatus for providing the tactile information inputs differing driving voltages to an electrode 610 and an electrode 620.

The electrode 610 generates an electrostatic force based on a driving voltage input, and provides tactile information 611 to a thumb of the user. The electrode 620 generates an electrostatic force based on a driving voltage input, and provides tactile information 621 to an index finger of the user.

The tactile information 611 and the tactile information 621 may differ in a frequency or an intensity of a vibration as shown in FIG. 6.

The user recognizes that a vibration sensed by the thumb differs from a vibration sensed by the index finger, and recognizes that different buttons are pressed by the thumb and the index finger, respectively.

Figure 7:
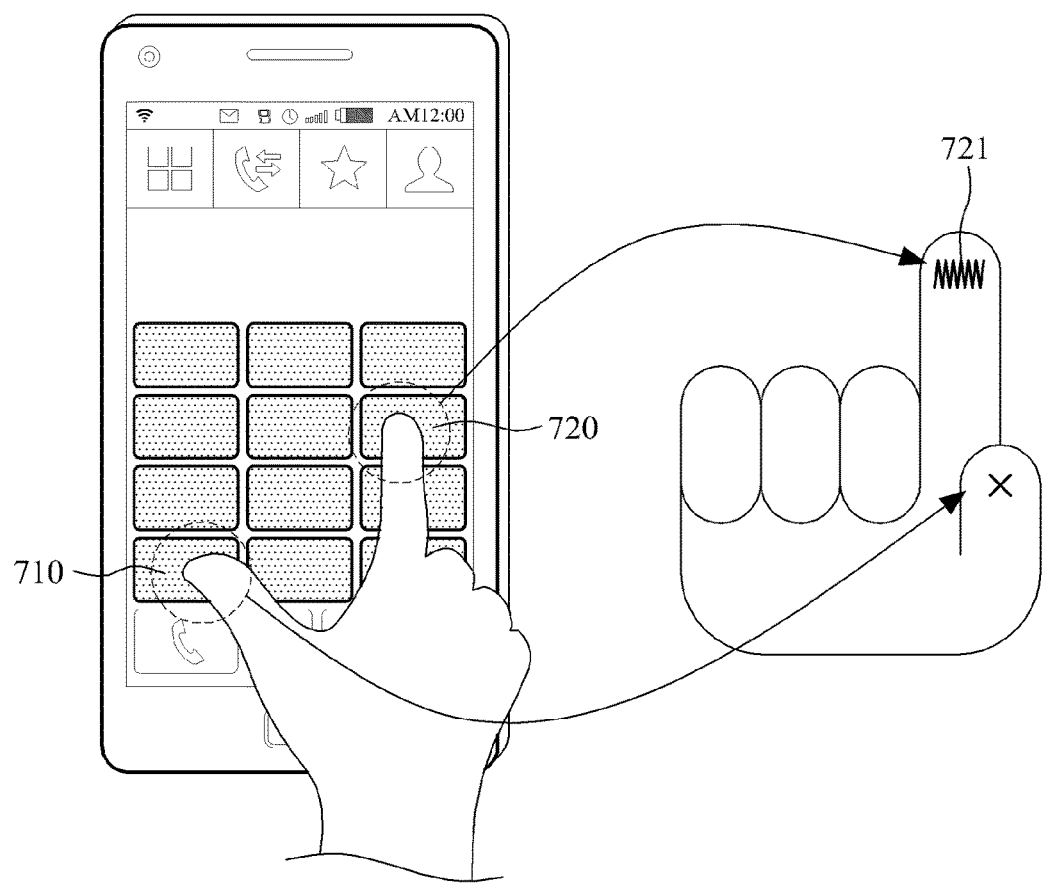
FIG. 7 illustrates an example in which an apparatus for providing tactile information provides tactile information to one of a plurality of fingers making contact according to example embodiments.

FIG. 7 illustrates an example in which an apparatus for providing tactile information provides tactile information to one of a plurality of fingers making contact according to example embodiments.

Referring to FIG. 7, the apparatus for providing the tactile information does not input a driving voltage to an electrode 710, and inputs differing driving voltages to an electrode 720.

The electrode 720 generates an electrostatic force based on the driving voltages input, and provide tactile information 721 to an index finger of a user.

When at least two fingers contact the apparatus for providing the tactile information, or at least two portions on a skin of the user contact the apparatus for providing the tactile information, tactile information may be provided to a desired object from among the at least two fingers or the at least two portions on the skin making contact.

Figure 8:
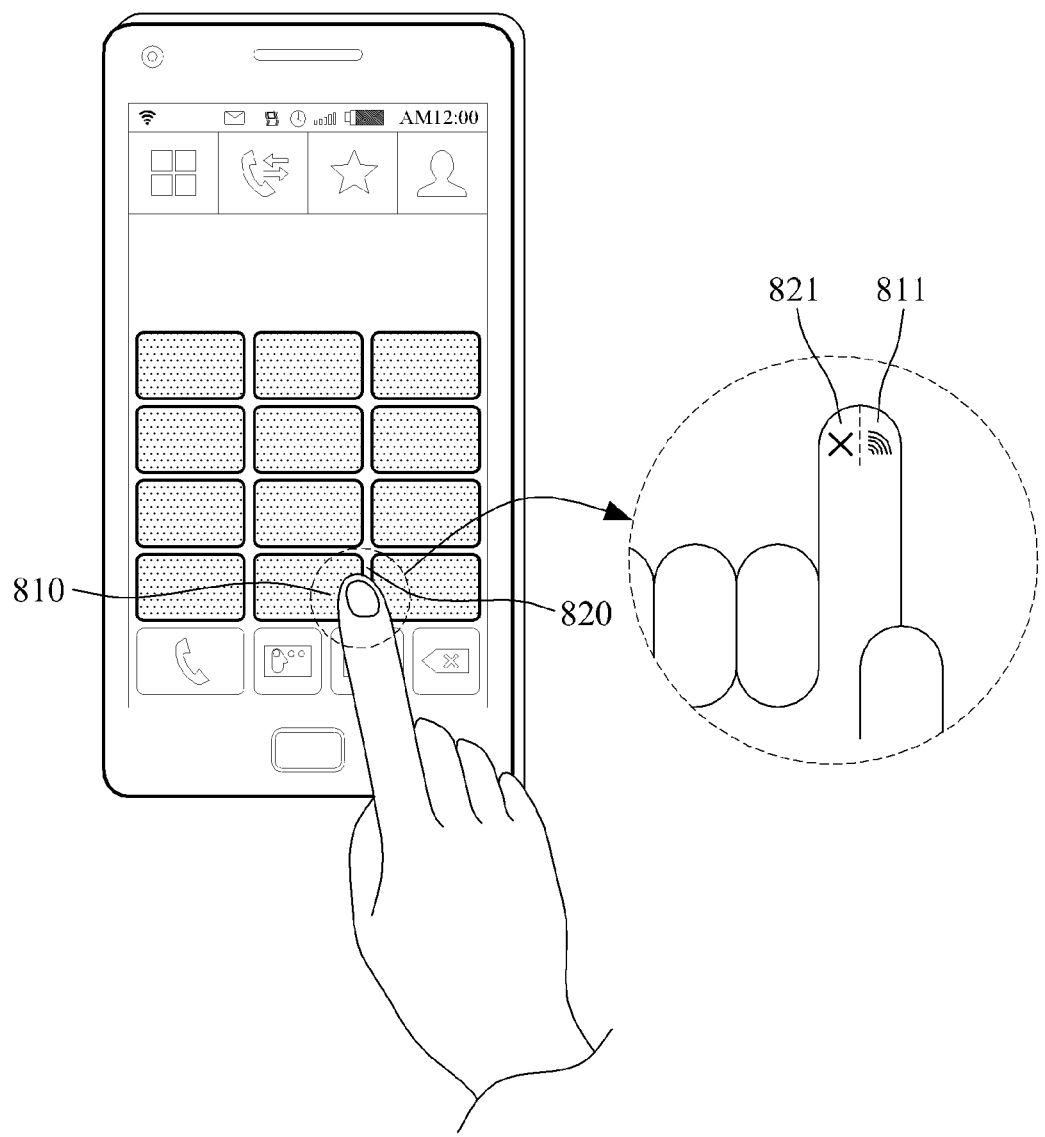
FIG. 8 illustrates an example in which an apparatus for providing tactile information provides two items of tactile information to a single finger of a user according to example embodiments.

FIG. 8 illustrates an example in which an apparatus for providing tactile information provides two items of tactile information to a single finger of a user according to example embodiments.

The user presses a plurality of buttons simultaneously as shown in FIG. 8. The apparatus for providing the tactile information inputs differing driving voltages to an electrode 810 and an electrode 820.

The electrode 810 generates an electrostatic force based on a driving voltage input, and provides tactile information 811 onto a left portion of a finger of the user. Also, the electrode 820 generates an electrostatic force based on a driving voltage input, and provides tactile information 821 onto a right portion of the finger of the user.

The tactile information 811 and the tactile information 821 may differ in a frequency or an intensity of a vibration as shown in FIG. 8.

The user recognizes two types of vibrations on the finger, and recognizes that the user presses two buttons simultaneously.

The apparatus for providing the tactile information controls the driving voltage input to the electrode 810 and the electrode 820 to allow the intensity of the vibration to be proportional to an area making contact with the finger of the user, and indicates a button recognized as an input by a mobile device from among the two buttons pressed by the user.

The apparatus for providing the tactile information controls the driving voltage input to the electrode 810 and the electrode 820 to allow an electrode of a button recognized by a mobile device from among buttons making contact with the user to provide tactile information. When the user senses tactile information different from the button selected by the user, the user may recognize that a wrong button is selected, and re-input another button.

Figure 9:
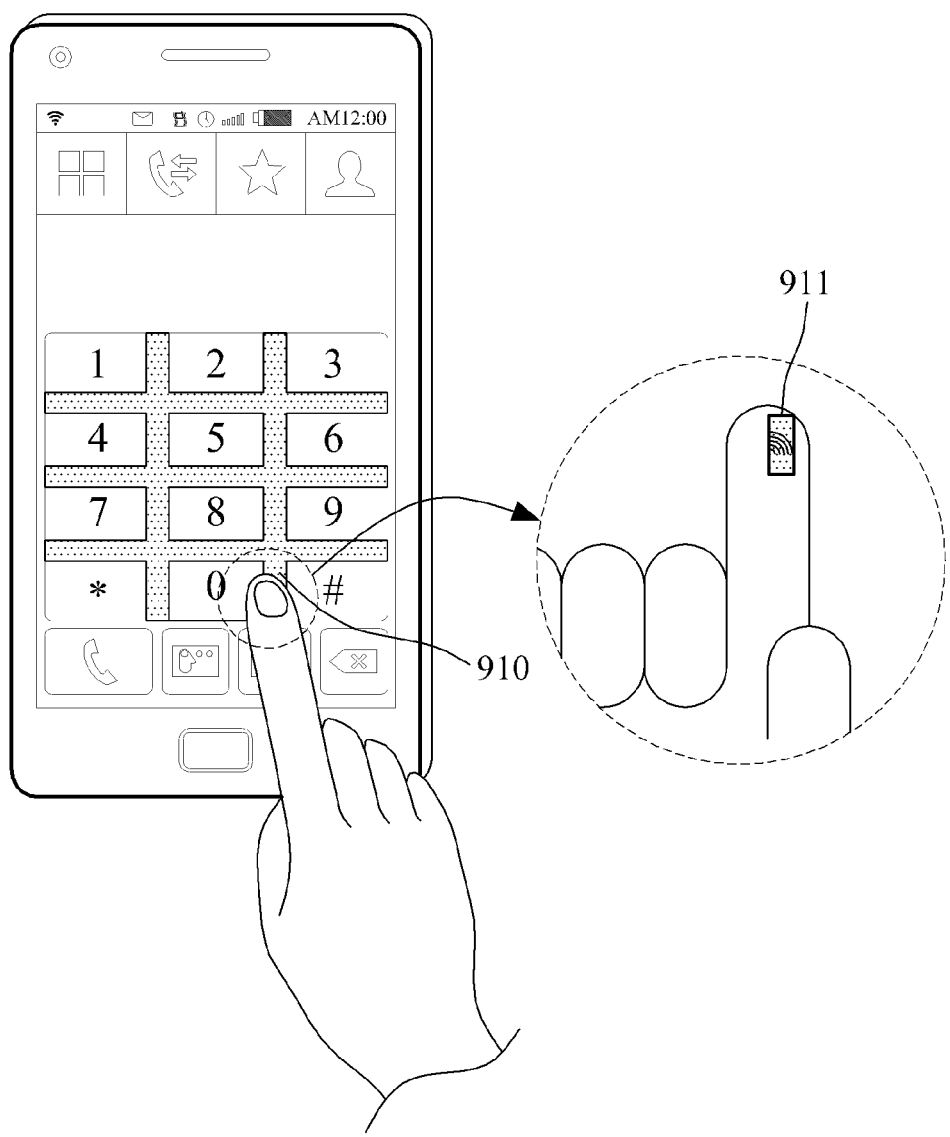
FIG. 9 illustrates an example in which an apparatus for providing tactile information provides tactile information indicating a boundary of a button to a user according to example embodiments.

FIG. 9 illustrates an example in which an apparatus for providing tactile information provides tactile information indicating a boundary of a button to a user according to example embodiments.

The apparatus for providing the tactile information includes a form in which an electrode 910 is disposed between a button and another button as shown in FIG. 9.

The electrode 910 provides tactile information 911 that gives the user a sense of boundaries of a button based on a driving voltage.

When the user feels the sense of boundaries of the button while moving a finger, the user may recognize that the finger crosses over to the other button in a vicinity.

Figure 10:
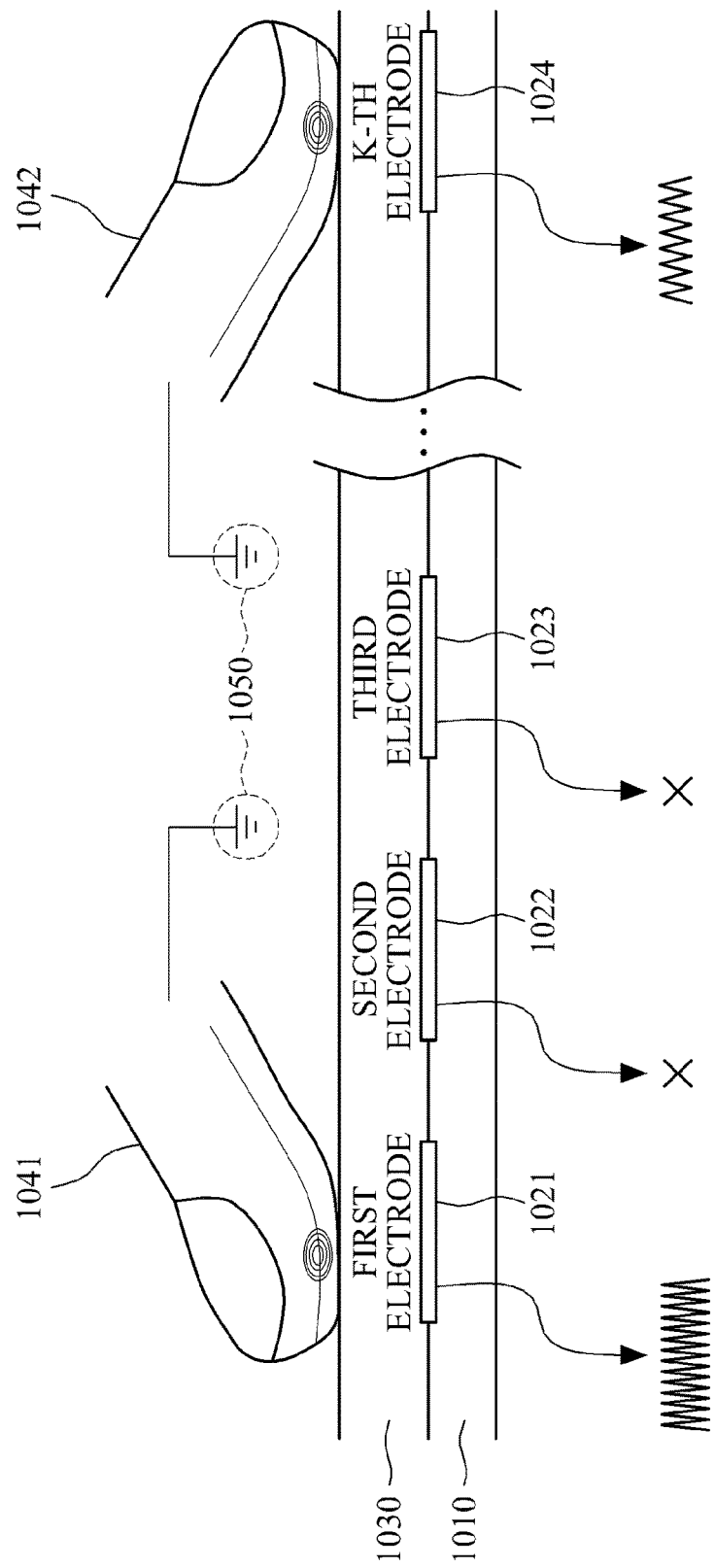
FIG. 10 illustrates an example in which an apparatus for providing tactile information provides tactile information differing based on a position of a finger of a user according to example embodiments.

FIG. 10 illustrates an example in which an apparatus for providing tactile information provides tactile information differing based on a position of a finger of a user according to example embodiments.

Referring to FIG. 10, the apparatus for providing the tactile information includes a form in which a first electrode 1021, a second electrode 1022, a third electrode 1023, through a k-th electrode 1024 are disposed on a substrate 1010, and a dielectric substance layer 1030 is formed on the first electrode 1021 through the k-th electrode 1024.

For example, a finger 1041 of the user contacts the dielectric substance layer 1030 formed on the first electrode 1021, and another finger 1042 of the user contacts the dielectric substance layer 1030 formed on the k-th electrode 1024.

The apparatus for providing the tactile information inputs differing driving voltages to the first electrode 1021 and the k-th electrode 1024, respectively, and does not input a driving voltage to the second electrode 1022 and the third electrode 1023 as shown in FIG. 10.

The user senses differing tactile information in the finger 1041 and the finger 1042, respectively. An electric charge applied to the dielectric substance layer 1030 between the first electrode 1021 and the finger 1041 is discharged to a ground area 1050 via the finger 1041. An electric charge applied to the dielectric substance layer 1030 between the k-th electrode 1024 and the finger 1042 by the k-th electrode 1024 is discharged to the ground area 1050 via the finger 1042.

When the finger 1041 and the finger 1042 move to a position of the second electrode 1022 or the third electrode 1023, tactile information may not be provided to the user because the driving voltages are not input to the second electrode 1022 and the third electrode 1023.

Figure 11:
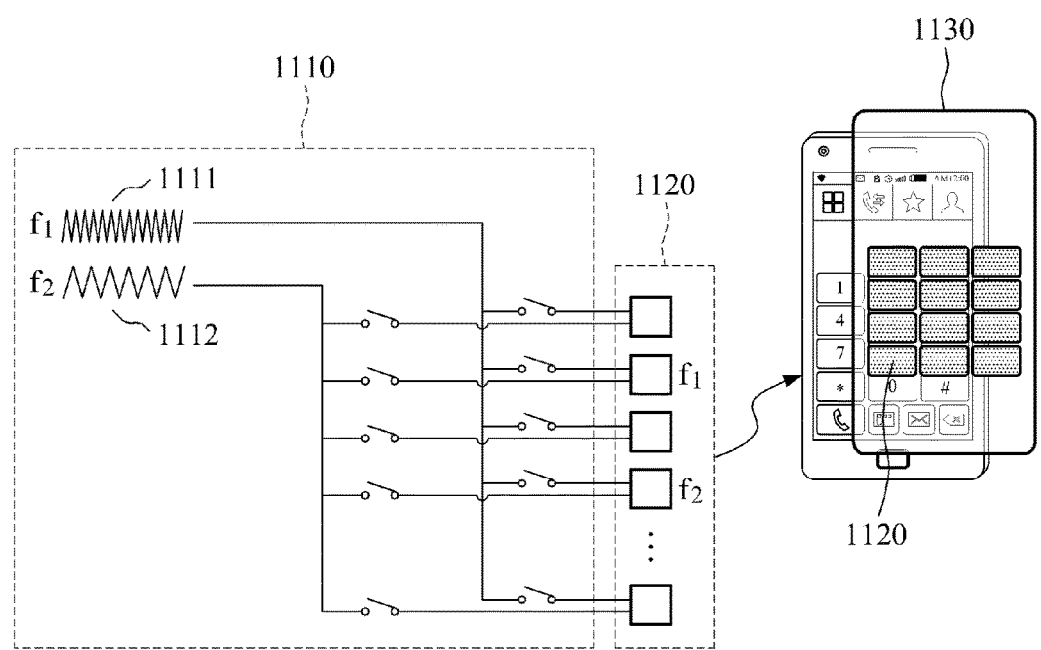
FIG. 11 illustrates an example of a driving voltage controller according to example embodiments.

FIG. 11 illustrates an example of a driving voltage controller 1110 according to example embodiments.

The driving voltage controller 1110 includes a plurality of switches corresponding to a first driving voltage 1111, and a plurality of switches corresponding to a second driving voltage 1112 as shown in FIG. 11.

The plurality of switches is connected to a plurality of electrodes 1120 of an apparatus 1130 for providing tactile information.

When an electrode to which the first driving voltage 1111 is to be input is present, the driving voltage controller 1110 closes a switch connected to the electrode from among the plurality of switches corresponding to the first driving voltage 1111, and inputs the first driving voltage 1111 to the electrode. The electrode provides a vibration having an intensity and an amplitude corresponding to the first driving voltage 1111 to the user.

When an electrode to which the second driving voltage 1112 is to be input is present, the driving voltage controller 1120 closes a switch connected to the electrode from among the plurality of switches corresponding to the second driving voltage 1112, and inputs the second driving voltage 1112 to the electrode. The electrode provides a vibration having an intensity and an amplitude corresponding to the second driving voltage 1112 to the user.

The driving voltage controller 1110 controls a type and an intensity of tactile information provided by the plurality of electrodes 1120 to the user by connecting the plurality of switches corresponding to the plurality of driving voltages and controlling the plurality of switches based on the driving voltages to be input to the plurality of electrodes 1120.

Figure 12:
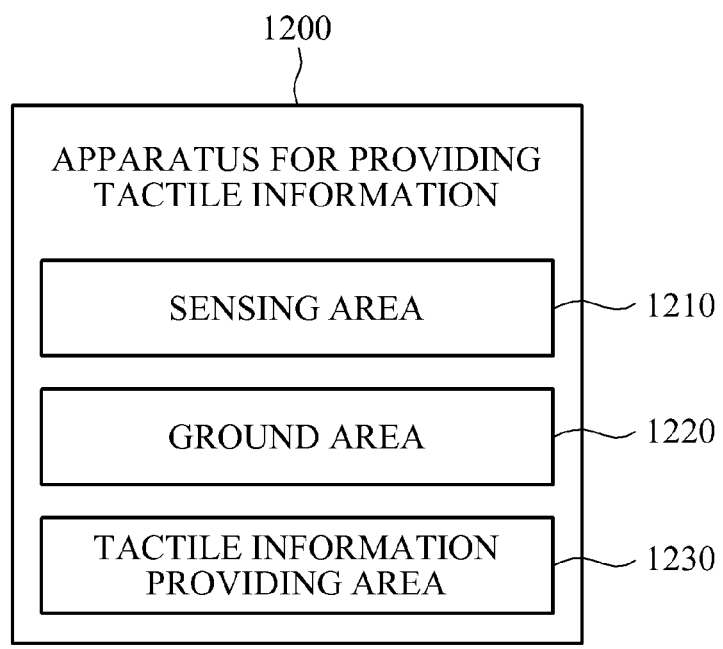
FIG. 12 illustrates a configuration of an apparatus for providing tactile information according to example embodiments.

FIG. 12 illustrates a configuration of an apparatus 1200 for providing tactile information according to example embodiments.

The apparatus 1200 of FIG. 12 may detect a contact of a user and provide tactile information to the user making the contact.

Referring to FIG. 12, the apparatus 1200 for providing the tactile information includes a sensing area 1210, a ground area 1220, and a tactile information providing area 1230.

The sensing area 1210 detects a contact of the user using an electrode disposed on a display. For example, the sensing area 1210 refers to a tactile information sensor.

The ground area 1220 is bonded onto at least one of one end of the display onto which the apparatus 1220 for providing the tactile information is bonded and one end of an object, and discharges an electric charge applied to a dielectric substance layer between the user and an electrode of the tactile information providing area 1230 via a skin of the user.

The tactile information providing area 1230 is bonded onto a top surface of the sensing area 1210, and provides tactile information to the user using an electrostatic force between the user making contact with the dielectric substance layer and an electrode disposed on the top surface of the sensing area 1210.

A configuration of the tactile information providing area 1230 will be discussed with reference to FIG. 13.

A bonding relationship between the sensing area 1210 and the tactile information providing area 1230 and a configuration of the sensing area 1210 will be described in detail with reference to FIGS. 14 and 15.

Figure 13:
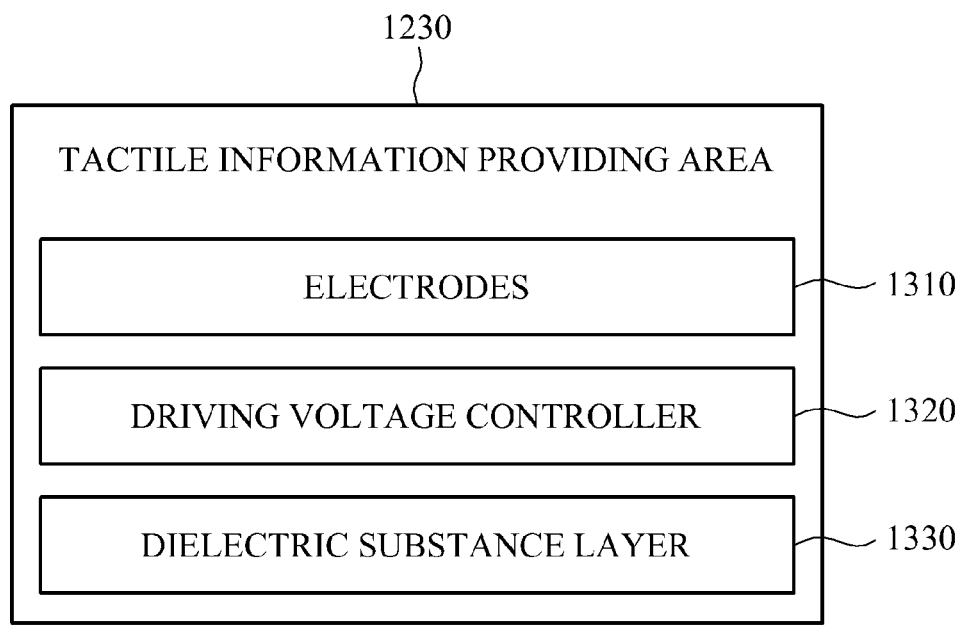
FIG. 13 illustrates a configuration of a tactile information providing area according to example embodiments.

FIG. 13 illustrates a configuration of a tactile information providing area 1230 according to example embodiments.

Referring to FIG. 13, the tactile information providing area 1230 includes a plurality of electrodes 1310, a driving voltage controller 1320, and a dielectric substance layer 1330.

The plurality of electrodes 1310 is disposed on the sensing area 1210, and operates in response to a driving voltage input. When the plurality of electrodes 1310 operates, an electrostatic force between a user making contact with the dielectric substance layer 1330 and the plurality of electrodes 1310 is generated, and tactile information is provided to the user.

For example, the plurality of electrodes 1310 may be formed in a transparent material, such as indium tin oxide (ITO), graphene, a carbon nanotube (CNT), and a silver nano wire, and may not prevent the user from recognizing content of a display due to the plurality of electrodes 1310.

The plurality of electrodes 1310 is disposed, in a form of an array, on the sensing area 1210, and the plurality of electrodes 1310 operates independently.

The driving voltage controller 1320 independently controls a driving voltage that applied to the plurality of electrodes 1310. For example, the driving voltage controller 1320 inputs the driving voltage in a form of a modulated voltage.

The driving voltage controller 1320 enables the plurality of electrodes 1310 to generate differing electrostatic forces by differently controlling driving voltages input to the plurality of electrodes 1310. The tactile information provided to the user is determined based on an electrostatic force generated by an electrode closest to a position at which the user making contact with the dielectric substance layer 1330 from among the plurality of electrodes 1310 because the tactile information provided to the user corresponds to the electrostatic force.

The driving voltage controller 1320 provides tactile information differing based on the position at which the user makes contact with the dielectric substance layer 1330 by controlling a voltage of the driving voltage input to the plurality of electrodes 1310.

The dielectric substance layer 1330 is formed on the plurality of electrodes 1310, and refers to a configuration with which the user makes contact.

The dielectric substance layer 1330 may include one of a compound having a high permittivity and an organic material having a high permittivity. For example, the compound having the high permittivity may be composed of at least one selected from a group of strontium titanate ($SrTiO_3$), an $SrTiO_3$ compound, barium titanate ($BaTiO_3$), a $BaTiO_3$ compound, hafnium oxide ($HfO_2$), aluminum oxide ($Al_2O_3$), titanium dioxide ($TiO_2$), and zirconium dioxide ($ZrO_2$).

Figure 14:
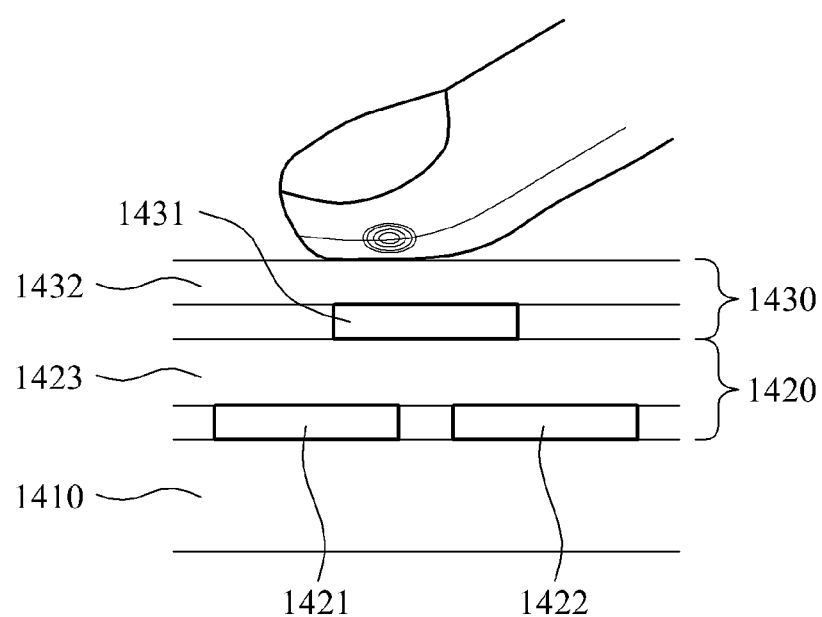
FIG. 14 illustrates an example of an apparatus for providing tactile information according to example embodiments.

FIG. 14 illustrates an example of an apparatus for providing tactile information according to example embodiments.

A sensing area 1420 of the apparatus for providing the tactile information includes a second electrode 1421, a third electrode 1422, and a blocking layer 1423. The second electrode 1421 corresponds to a positive electrode that outputs a current, and the third electrode 1422 corresponds to a negative electrode that receives the current output from the second electrode 1421.

The second electrode 1421 and the third electrode 1422 are formed on a display 1410, and the blocking layer 1423 is formed on the second electrode 1421 and the third electrode 1422.

The sensing area 1420 measures a change in a current flowing from the second electrode 1421 to the third electrode 1422. When the current that the third electrode 1422 receives changes, the sensing area 1420 senses a position at which a user makes contact based on a position of the third electrode 1422 that receives the changed current. For example, the sensing area 1420 detects that a finger of the user contacts a dielectric substance layer 1432 disposed between the second electrode 1421 that outputs the current and the third electrode 1422 that receives the changed current.

The blocking layer 1423 blocks transmission of the current output from the second electrode 1421 to the tactile information providing area 1430. For example, the blocking layer 1423 may be formed by a polymer or glass.

The tactile information providing area 1430 of the apparatus for providing the tactile information includes a first electrode 1431 and the dielectric substance layer 1432 as shown in FIG. 14. The first electrode 1431 is disposed on the blocking layer 1423 of the sensing area 1420, and the dielectric substance layer 1432 is formed on the first electrode 1431.

When the sensing area 1420 detects a contact of the user, the tactile information providing area 1430 inputs a driving voltage to the first electrode 1431. In this example, an electrostatic force is generated between the first electrode 1431 and the user making contact with the dielectric substance layer 1432, and tactile information is provided to the user.

Figure 15:
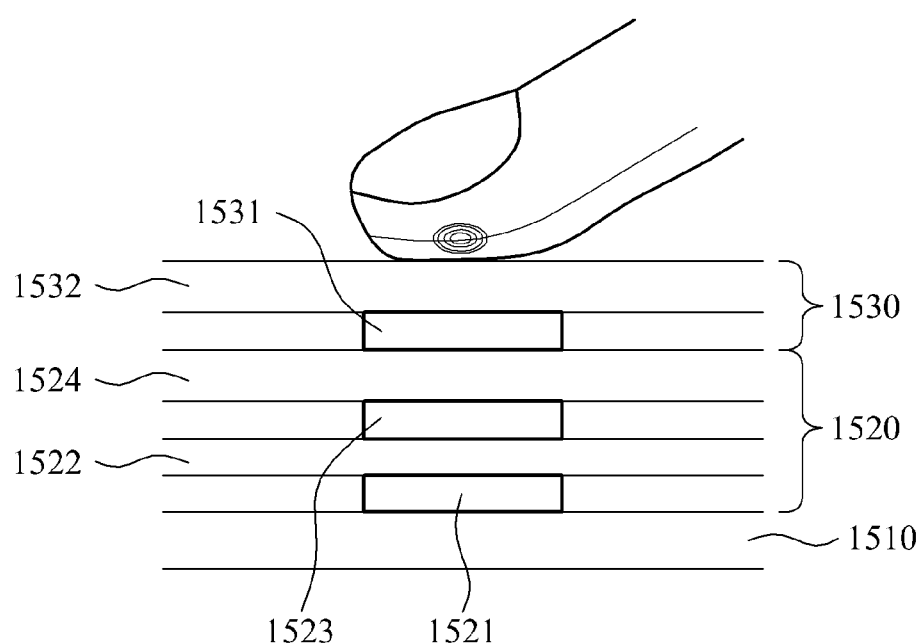
FIG. 15 illustrates another example of an apparatus for providing tactile information according to example embodiments.

FIG. 15 illustrates another example of an apparatus for providing tactile information according to example embodiments.

In particular, FIG. 15 is an example of the apparatus for providing the tactile information including a sensing area 1520 to detect a contact of a user and measure a pressure of the contact.

Referring to FIG. 15, the sensing area 1520 of the apparatus for providing the tactile information includes a second electrode 1521, an elastic layer 1522, a third electrode 1523, and a blocking layer 1524.

The second electrode 1521 is disposed on the display 1510, and the elastic layer 1522 is formed between the second electrode 1521 and the third electrode 1523. Also, the blocking layer 1524 is formed on the third electrode 1523.

The elastic layer 1522, disposed between the second electrode 1521 and the third electrode 1523, changes a distance between the second electrode 1521 and the third electrode 1523 through a transformation based on an external pressure. For example, the elastic layer 1522 may be formed in a transparent elastic material, for example, polydimethylsiloxane (PDMS) or EcoFlex.

The sensing area 1520 detects the distance between the second electrode 1522 and the third electrode 1523. For example, the sensing area 1520 detects the distance between the second electrode 1522 and the third electrode 1523 based on a change in a current flowing from the second electrode 1521 and the third electrode 1523.

A decrease in the distance between the second electrode 1521 and the third electrode 1523 may indicate that the elastic layer 1522 is compressed by a pressure applied from the user making contact with a dielectric substance layer 1532.

When the distance between the second electrode 1521 and the third electrode 1523 decreases, the sensing area 1520 senses a position of the decreased distance between the second electrode 1521 and the third electrode 1523 to be the position at which the user makes contact.

The distance between the second electrode 1521 and the third electrode 1523 is inversely proportional to a pressure input to the apparatus for providing the tactile information by the user. Accordingly, the sensing area 1520 senses a magnitude of the pressure applied to the dielectric substance layer 1532 by the user based on a difference between a thickness of the elastic layer 1522 and the changed distance between the second electrode 1521 and the third electrode 1523.

The blocking layer 1523 blocks transmission of the current output from the second electrode 1521 to the tactile information providing area 1530. For example, the blocking layer 1523 may be formed by polymer or glass.

The tactile information providing area 1530 of the apparatus for providing the tactile information includes a first electrode 1531 and the dielectric substance layer 1532 as shown in FIG. 14. The first electrode 1531 is disposed on the blocking layer 1524, and the dielectric substance layer 1532 is formed on the first electrode 1531.

When the sensing area 1520 detects a contact of the user, the tactile information providing area 1530 inputs a driving voltage to the first electrode 1531. In this example, an electrostatic force between the first electrode 1531 and the user making contact with the dielectric substance layer 1532 is generated, and tactile information is provided to the user.

Figure 16:
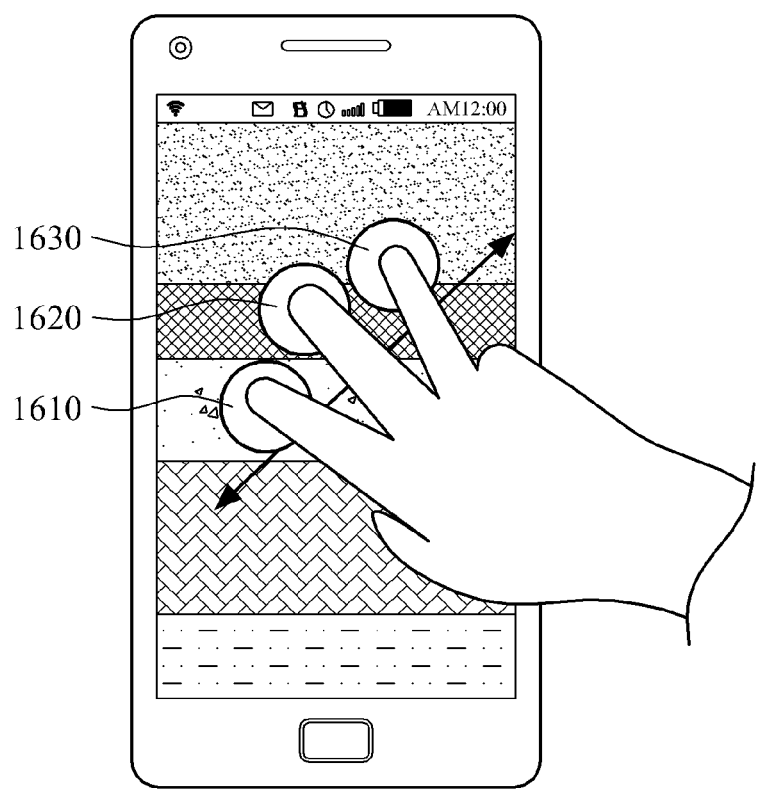
FIG. 16 illustrates an example in which an apparatus for providing tactile information provides, to a user, a texture based on a position of a contact according to example embodiments.

FIG. 16 illustrates an example in which an apparatus for providing tactile information provides, to a user, a texture based on a position of a contact according to example embodiments.

The apparatus for providing the tactile information determines tactile information provided to a user based on a texture of an object displayed on a position at which the user makes contact from among images displayed by a display.

For example, as shown in FIG. 16, when images having differing textures are displayed on the display, the apparatus for providing the tactile information provides the tactile information differing based on an area of the images.

The apparatus for providing the tactile information controls an intensity, an amplitude, and a duration of a vibration in the tactile information provided to the user by controlling a frequency, an amplitude, and an input duration of a driving voltage input to an electrode corresponding to the area of the images.

For example, the apparatus for providing the tactile information provides tactile information that gives a user a sense of making contact with rock by controlling a frequency, an amplitude, and an input duration of a driving voltage input to an electrode 1610 of an area displaying the rock. The apparatus for providing the tactile information provides tactile information that gives a user a sense of making contact with grass by controlling a frequency, an amplitude, and an input duration of a driving voltage input to an electrode 1620 of an area displaying the grass.

The apparatus for providing the tactile information provides tactile information that gives a sense of making contact with sand to the user by controlling a frequency, an amplitude, and an input duration of a driving voltage input to an electrode 1630 of an area displaying the sand.

The apparatus for providing the tactile information enables the user making contact with an area of an image to feel an actual sense of a texture of an object displayed in the area of the image by providing tactile information differing based on the area of the image to the user.

Figure 17:
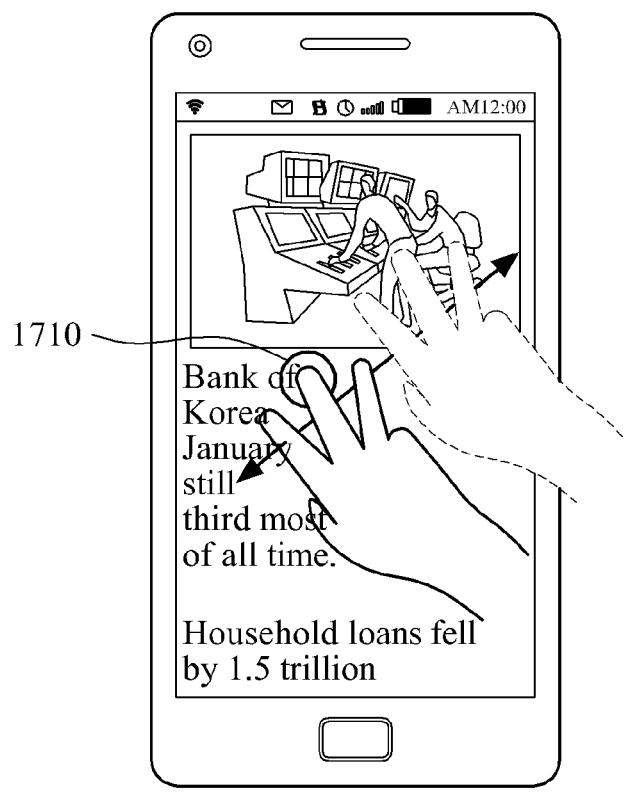
FIG. 17 illustrates an example in which an apparatus for providing tactile information provides, to a user, tactile information of making contact with a link according to example embodiments.

FIG. 17 illustrates an example in which an apparatus for providing tactile information provides tactile information of making contact with a link 1710 to a user according to example embodiments.

The apparatus for providing the tactile information provides tactile information in an area in which predetermined information is displayed from among information displayed by a display.

For example, the apparatus for providing the tactile information provides tactile information to the link 1710 connected to a document. The link 1710 refers to a predetermined link, or any link included in the display. The document differs from another document including information provided by the display.

In this example, the user slides a plurality of fingers on the apparatus for providing the tactile information, and identifies a position at which tactile information is provided. The user displays the document connected to the link 1710 on the display by pressing the identified position or selecting the identified position using another device.

The apparatus for providing the tactile information enables the user to select desired information based on tactile information by determining whether to provide tactile information and a type of the tactile information provided, based on a type of information displayed in an image.

Figure 18:
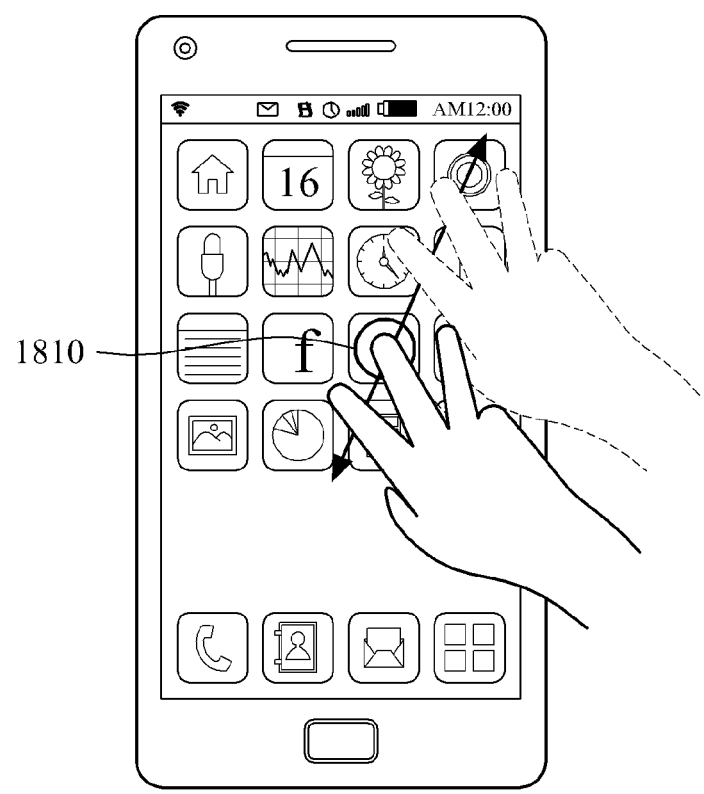
FIG. 18 illustrates an example in which an apparatus for providing, to a user, tactile information provides tactile information of the user making contact with a predetermined icon to according to example embodiments.

FIG. 18 illustrates an example in which an apparatus for providing, to a user, tactile information provides tactile information of the user making contact with a predetermined icon to according to example embodiments.

The apparatus for providing the tactile information maps tactile information to a predetermined icon from among icons displayed by a display. The predetermined icon refers to an icon selected by the user, or an icon selected by the user in excess of a predetermined number of times. When the predetermined icon is the icon selected by the user in excess of the predetermined number of times, the tactile information mapped to the predetermined icon is determined based on the number of times the user selects the predetermined icon.

The apparatus for providing the tactile information maps differing tactile information to icons displayed by the display, or to a keypad.

The apparatus for providing the tactile information determines whether the user contacts an icon, and when the user is determined to contact the icon, provides the tactile information mapped to the icon to the user.

Accordingly, the user identifies and selects a desired icon through the tactile information provided to a finger without viewing at the display.

For example, the apparatus for providing the tactile information maps tactile information to a keypad corresponding to each letter of "f" and "j" for which a protrusion is formed on a keyboard. The user disposes index fingers of both hands at a position of the keypad to which the tactile information is provided, and types without viewing at the keypad in a manner similar to using the keyboard.

Figure 19:
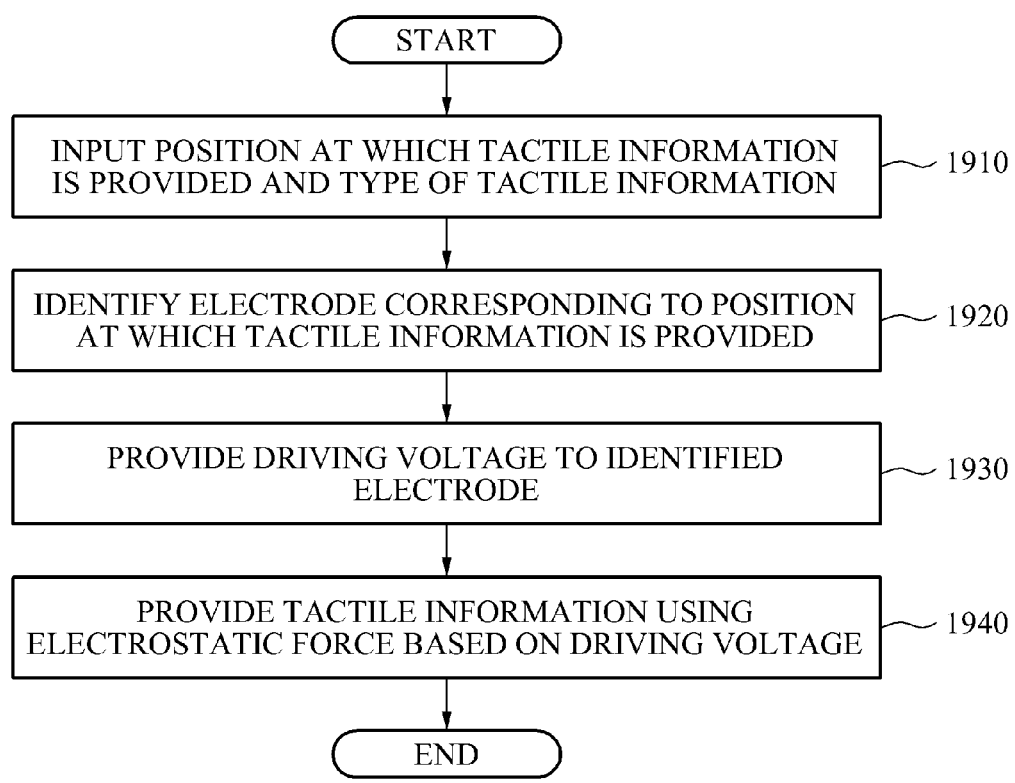
FIG. 19 illustrates an operation of an apparatus for providing tactile information according to example embodiments.

FIG. 19 illustrates an operation of an apparatus for providing tactile information according to example embodiments.

In operation 1910, the driving voltage controller 130 receives an input of a position at which tactile information is provided to a user, and a type of the tactile information provided to the user.

In operation 1920, the driving voltage controller 130 identifies the electrodes 120 corresponding to the position input in operation 1910.

In operation 1930, the driving voltage controller 130 provides a driving voltage corresponding to the type of tactile information input in operation 1910 to the electrodes 120 identified in operation 1920.

In operation 1940, the electrodes 120 apply an electric charge to the dielectric substance layer 140 adjacent to the electrodes 120 using the driving voltage provided in operation 1930. When the driving voltage controller 130 changes the driving voltage input to the electrodes 120, an electrostatic force is generated between the electrodes 120 and the user, and tactile information is provided to the user.

Figure 20:
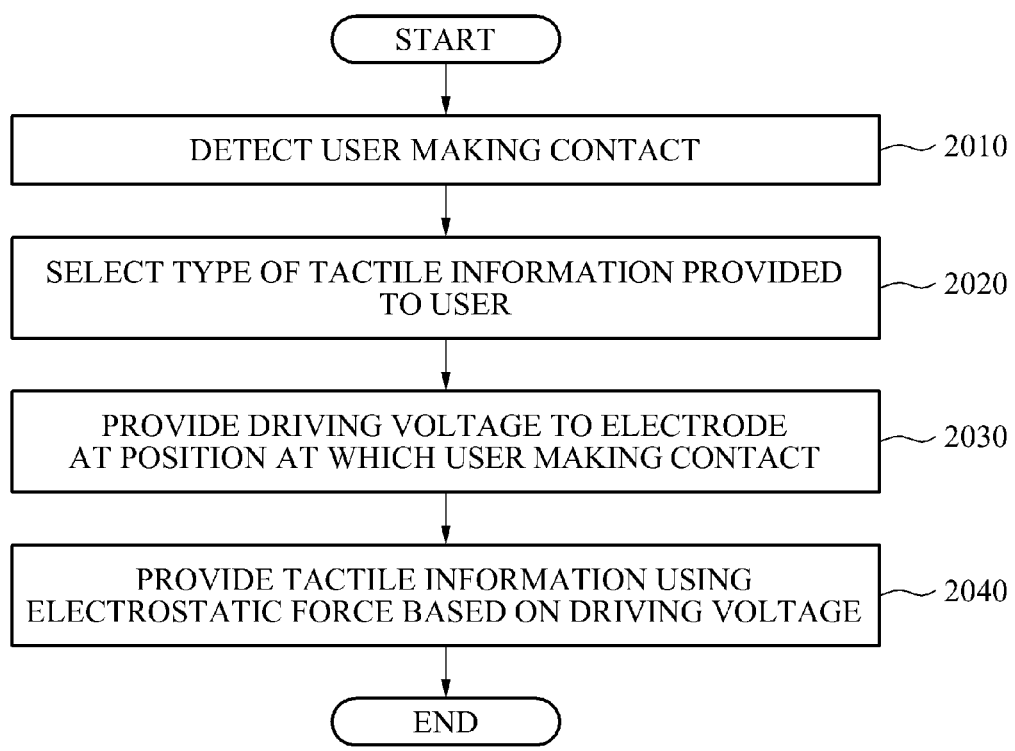
FIG. 20 illustrates an operation of an apparatus for providing tactile information according to example embodiments.

FIG. 20 illustrates an operation of an apparatus for providing tactile information according to example embodiments.

In operation 2010, the sensing area 1210 detects that a user makes contact with the dielectric substance layer 1330.

In operation 2020, the tactile information providing area 1230 selects tactile information provided to the user based on a position at which the user makes contact detected in operation 2010. For example, in FIG. 18, when the position at which the user makes contact corresponds to an icon, the tactile information providing area 1230 selects tactile information indicating the icon to be tactile information provided to the user.

In operation 2030, the tactile information providing area 1230 provides a driving voltage to the electrodes 1310 corresponding to the position at which the user makes contact detected in operation 2010. The driving voltage provided to the electrodes 1310 by the tactile information providing area 1230 refers to a driving voltage corresponding to the tactile information selected in operation 1210.

In operation 2040, the electrodes 1310 apply an electric charge to the dielectric substance layer 1230 adjacent to the electrodes 1210 using the driving voltage provided in operation 2030. When the driving voltage controller 1220 changes the driving voltage input to the electrodes 1210, an electrostatic force is generated between the electrodes 1310 and the user, and tactile information is provided to the user.

Figure 21:
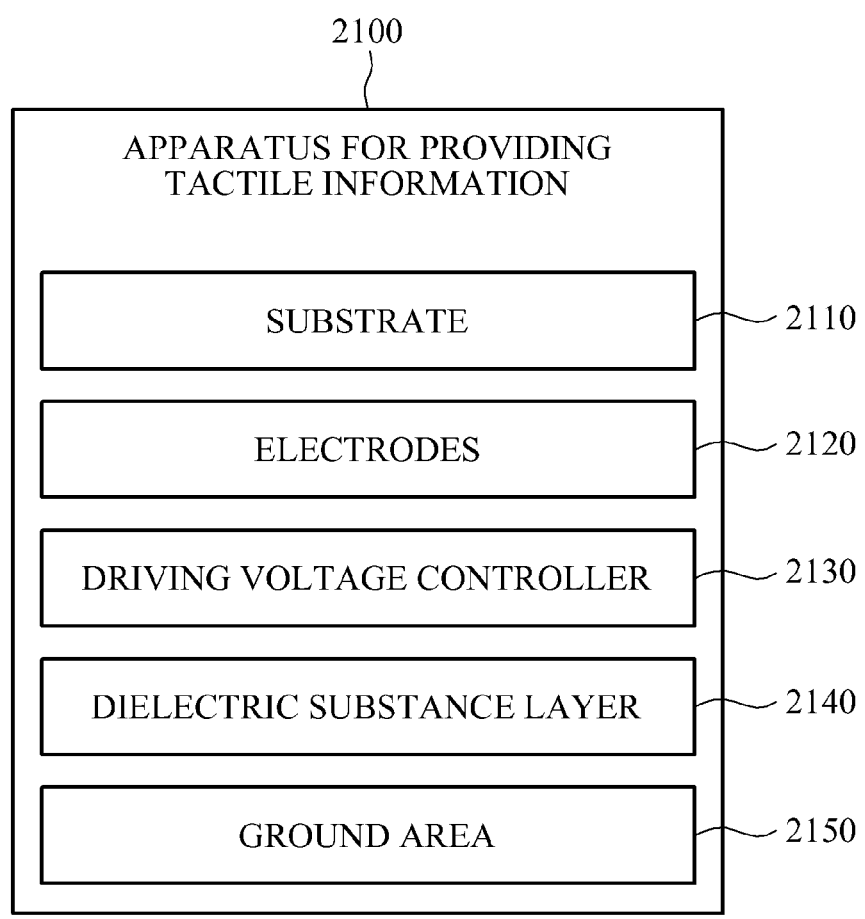
FIG. 21 illustrates a configuration of an apparatus for providing tactile information according to example embodiments.

FIG. 21 illustrates a configuration of an apparatus 2100 for providing tactile information according to example embodiments.

FIG. 21 is an example of the apparatus 2100 for providing the tactile information in which a ground area to discharge an electric charge to a dielectric substance layer is disposed amongst electrodes.

Referring to FIG. 21, the apparatus 2100 for providing the tactile information includes a substrate 2110, electrodes 2120, a driving voltage controller 2130, a dielectric substance layer 2140, and a ground area 2150.

For conciseness and ease of description, details pertaining to descriptions of the substrate 2110, the electrodes 2120, the driving voltage controller 2130, and the dielectric substance layer 2140 that may be applied to the substrate 110, the electrodes 120, the driving voltage controller 130, and the dielectric substance layer 140 previously discussed with reference to FIG. 1 are omitted.

The ground area 2150, disposed amongst the electrodes 2120, grounds and discharges an electric charge applied to the dielectric substance layer 2130 by the electrodes 2120.

The apparatus 2100 for providing the tactile information disposes the ground area 2150 amongst the electrodes 2120, and discharges the electric charge applied to the dielectric substance layer 2130 absent an additional ground area making contact with a skin of a user. An electric charge is re-applied, by the electrodes 2120, to the dielectric substance layer 2130 to which the electric charge is discharged, and an electrostatic force that provides tactile information to the user is generated.

Figure 22:
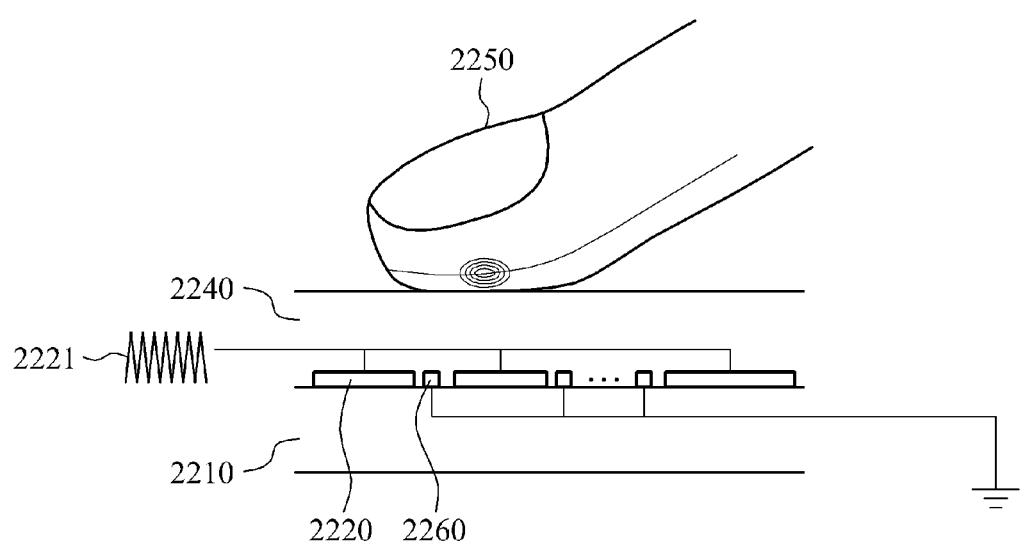
FIG. 22 illustrates an example in which an apparatus for providing tactile information provides tactile information according to example embodiments.

FIG. 22 illustrates an example in which an apparatus 2100 for providing tactile information provides tactile information according to example embodiments.

Referring to FIG. 22, the apparatus 2100 for providing the tactile information inputs a driving voltage 2221 to at least one electrode 2220 from among electrodes disposed on a substrate 2210. A user 2250 contacts a dielectric substance layer 2240 formed on the electrode 2220.

The electrode 2220 applies an electric charge to the dielectric substance layer 2240 with which the user 2250 makes contact. When the electrode 2220 changes the electric charge applied based on the driving voltage 2221, an electrostatic force is generated, and tactile information is provided to the user 2250.

In a state of an electric charge being applied to the dielectric substance layer 2240, a change in the electric charge may be nominal although the electrode 2220 re-applies an electric charge in an attempt to re-provide tactile information to the user. When the change in the electric charge of the dielectric substance layer 2240 is nominal, a magnitude of an electrostatic force generated may be low. Accordingly, the electric charge applied to the dielectric substance layer 2240 is discharged prior to tactile information being re-provided to the user.

A distance between a ground area 2260 and the electrode 2220 is shorter than a distance between the electrode 2220 and a finger of the user 2250 and a distance between the finger of the user 2250 and the ground area 2260. The electric charge applied to the dielectric substance layer 2240 by the electrode 2220 is applied to the finger of the user 2250, and an electrostatic force is generated. The electric charge applied to the finger of the user 2250 and the dielectric substance layer 2250 is discharged via the ground area 2260. The ground area 2260 enables the electric charge to be re-applied to the dielectric substance layer 2240 by the electrode 2220 by grounding and discharging the electric charge applied to the dielectric substance layer 2240.

Figure 23:
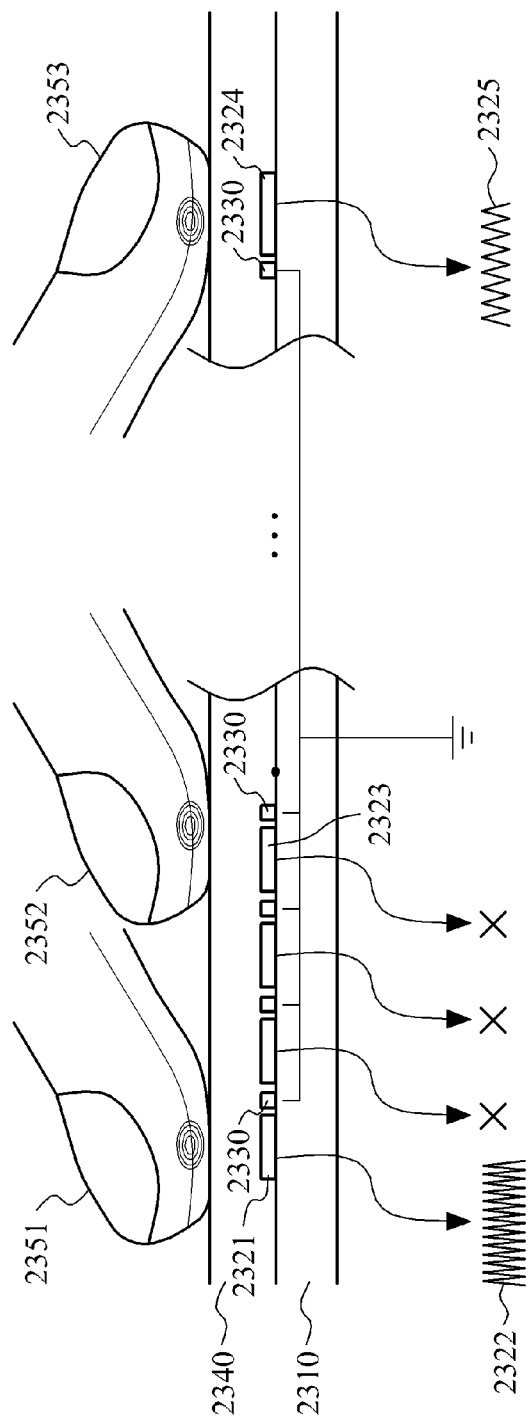
FIG. 23 illustrates an example in which an apparatus for providing tactile information provides differing tactile information based on a finger position of a user according to example embodiments.

FIG. 23 illustrates an example in which an apparatus for providing tactile information provides differing tactile information based on a finger position of a user according to example embodiments.

As shown in FIG. 23, in the apparatus for providing the tactile information, a plurality of electrodes is disposed on a substrate 2310, a ground area 2330 is disposed amongst the plurality of electrodes, and a dielectric substance layer 2340 is formed on the ground area 2330.

For example, a finger 2351 of the user contacts the dielectric substance layer 2340 formed on an electrode 2321 from among the plurality of electrodes, and a finger 2352 and a finger 2353 of the user contact the dielectric substance layer 2340 formed on an electrode 2323 and an electrode 2324, respectively.

As shown in FIG. 23, the apparatus for providing the tactile information may input a driving voltage 2325 differing from a driving voltage 2322 input to the electrode 2321 to an electrode 2324. The apparatus for providing the tactile information may not input a driving voltage to the electrode 2323.

The user senses differing tactile information in each of the finger 2351 and the finger 2353. Electric charges applied to the dielectric substance layer 1030 by the electrode 2321 and the electrode 2324 are discharged to the ground area 2330. The user may not sense tactile information on the finger 2352 from among the fingers making contact with the dielectric substance layer 2340 because a driving voltage is not input to the electrode 2323.

Figure 24:
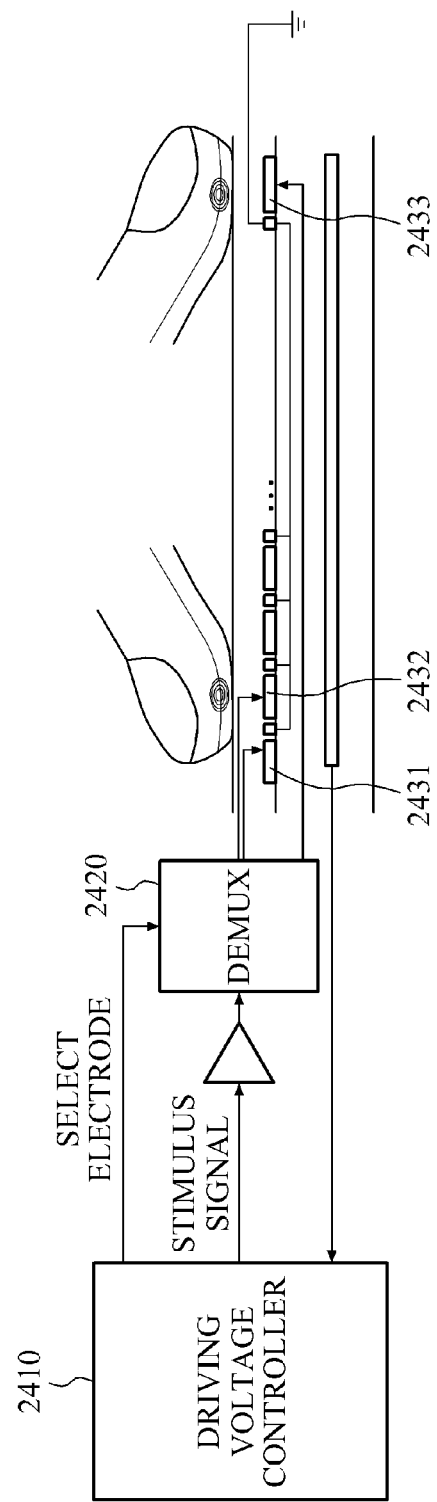
FIG. 24 illustrates a structure in which an apparatus for providing tactile information provides differing tactile information based on a finger position of a user according to example embodiments.

FIG. 24 illustrates a structure in which an apparatus for providing tactile information provides differing tactile information based on a finger position of a user according to example embodiments.

A driving voltage controller 2410 of the apparatus for providing the tactile information generates a plurality of driving voltages based on a type of tactile information provided to the user, and transmits the plurality of generated driving voltages to a demultiplexer (DEMUX) 2420.

The driving voltage controller 2410 selects an electrode at a position at which tactile information is provided to the user, and transmits information about the selected electrode to the DEMUX 2420. The driving voltage controller 2410 selects the electrode based on a position at which the user makes contact in a sensing area or a predetermined position.

The DEMUX 2420 provides the received driving voltages to an electrode corresponding to received information. An internal configuration of the DEMUX 2420 is identical to the driving voltage controller 1110 of FIG. 11.

For example, the DEMUX 2420 may provide a driving voltage to an electrode 2432, and may not transmit a driving voltage to an electrode 2431. When a finger moves to a position of the electrode 2432, or the finger contacts the position of the electrode 2432, the user may be provided with tactile information. Conversely, when the finger moves to the position of the electrode 2431, or the finger contacts the position of the electrode 2431, the user may not be provided with the tactile information.

Accordingly, when the user is provided with the tactile information, the user determines that the finger of the user is disposed at the position of the electrode 2432 without viewing at the position of the finger.

The DEMUX 2420 provides, to the electrode 2433, a driving voltage differing from the electrode 2432. When the finger moves to the position of the electrode 2433, or the finger contacts the position of the electrode 2433, the user is provided with tactile information differing from the electrode 2432. Electric charges applied to a dielectric substance layer are discharged absent an additional ground area making contact with a skin of the user because electric charges applied to the dielectric substance layer by the electrode 2431 and the electrode 2433 based on a driving voltage are discharged to a ground area disposed amongst the electrodes.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An apparatus for providing tactile information, the apparatus comprising:
   a plurality of electrodes disposed on a substrate; and
   a dielectric substance layer formed on the substrate and the plurality of electrodes,
   wherein the plurality of electrodes generates an electrostatic force that provides tactile information to a user making contact with the dielectric substance layer by applying an electric charge to the dielectric substance layer based on a driving voltage, and
   wherein the driving voltage is determined based on a texture of an object displayed at a position on a display at which the user makes contact when selecting from among images displayed by the display.

2. The apparatus of claim 1, wherein the plurality of electrodes controls an intensity, an amplitude, and a duration of a vibration by changing an electrostatic force based on a frequency, an amplitude, and an input duration of a driving voltage.

3. The apparatus of claim 1, wherein the plurality of electrodes provides differing tactile information to the user based on a position at which the user makes contact with the dielectric substance layer by applying an electric charge to a dielectric substance layer based on a plurality of driving voltages corresponding to positions of electrodes.

4. The apparatus of claim 1, wherein the plurality of electrodes is disposed in a form of an array on the substrate.

5. The apparatus of claim 1, wherein the dielectric substance layer is composed of at least one selected from a group of strontium titanate ($SrTiO_3$), an $SrTiO_3$ compound, barium titanate ($BaTiO_3$), a $BaTiO_3$ compound, hafnium oxide ($HfO_2$), aluminum oxide ($Al_2O_3$), and titanium dioxide ($TiO_2$).

6. An apparatus for providing tactile information, the apparatus comprising:
   a tactile information providing area and a sensing area,
   wherein the tactile information providing area comprises:
   a dielectric substance layer; and
   first electrodes to generate an electrostatic force that provides tactile information to a user making contact with the dielectric substance layer by applying an electric charge to the dielectric substance layer based on a driving voltage, and
   the sensing area comprises:
   a second electrode to output a current;
   a third electrode to receive the current output by the second electrode; and
   a blocking layer to block transmission of the current to the tactile information providing area,
   wherein the first electrodes apply the electric charge to the dielectric substance layer based on the driving voltage determined based on a position at which the user makes contact sensed by a difference between the current output by the second electrode and the current received by the third electrode, and
   wherein the driving voltage is determined based on a texture of an object displayed at a position on a display at which the user makes contact when selecting from among images displayed by the display.

7. The apparatus of claim 6, wherein when the current received by the third electrode changes, the position at which the user makes contact is sensed based on a position of the third electrode that receives the changed current.

8. An apparatus for providing tactile information, the apparatus comprising:
a tactile information providing area and a sensing area, wherein the tactile information providing area comprises:
a dielectric substance layer; and
first electrodes to generate an electrostatic force that provides tactile information to a user making contact with the dielectric substance layer by applying an electric charge to the dielectric substance layer based on a driving voltage, and
the sensing area comprises:
a second electrode to output a current;
a third electrode to receive the current output by the second electrode;
an elastic layer, disposed between the second electrode and the third electrode, to change a distance between the second electrode and the third electrode through a transformation based on an external pressure; and
a blocking layer to block transmission of the current to the tactile information providing area,
wherein the first electrodes apply the electric charge to the dielectric substance layer based on the driving voltage determined based on at least one of a position at which the user makes contact sensed by the distance between the second electrode and the third electrode and a magnitude of the external pressure, and
wherein the driving voltage is determined based on a texture of an object displayed at a position on a display at which the user makes contact when selecting from among images displayed by the display.

9. The apparatus of claim 8, wherein the position at which the user makes contact is sensed based on a change in the distance between the second electrode and the third electrode.

10. The apparatus of claim 8, wherein a magnitude of the external pressure is sensed based on a difference between a thickness of the elastic layer and the distance between the second electrode and the third electrode.

11. The apparatus of claim 8, further comprising:
a display to display at least one object,
wherein the first electrodes provide the tactile information to the user by applying the electric charge to the dielectric substance layer based on a driving voltage determined based on at least one of the position at which the user makes contact, a position at which the object is displayed on the display, and information about the object.

12. The apparatus of claim 11, wherein the first electrodes provide the tactile information to the user by applying the electric charge to the dielectric substance layer based on a driving voltage determined based on a type of the object corresponding to the position at which the user makes contact on the display.

13. The apparatus of claim 11, wherein when the position at which the user makes contact corresponds to at least one predetermined position at which tactile information is provided, the first electrodes provide the tactile information to the user by applying the electric charge to the dielectric substance layer.

14. A method of providing tactile information, the method comprising:
sensing a position at which a user makes contact with a dielectric substance layer using a sensing area;
providing a driving voltage to an electrode most adjacent to the sensed position of the user; and
applying, by the electrode, an electric charge to the dielectric substance layer based on the driving voltage, and generating an electrostatic force that provides tactile information to the user making contact with the dielectric layer,
wherein the driving voltage is determined based on a texture of an object displayed at a position on a display at which the user makes contact when selecting from among images displayed by the display.

15. The method of claim 14, further comprising:
determining the tactile information provided to the user based on the sensed position of the user, and
the providing comprises:
controlling the driving voltage based on the determined tactile information.

16. The method of claim 15, wherein the providing comprises:
controlling the driving voltage based on at least one of the position at which the user makes contact, a position at which an object is displayed on a display combined with the sensing area, and information about the object.

17. The method of claim 16, wherein the providing comprises:
controlling the driving voltage based on a type of the object corresponding to the position at which the user makes contact on the display.

18. The method of claim 16, wherein the generating comprises:
providing the tactile information to the user by applying the electric charge to the dielectric substance layer when the position at which the user makes contact is at least one predetermined position at which tactile information is provided.

19. An apparatus for providing tactile information, the apparatus comprising:
a dielectric substance layer;
electrodes to generate an electrostatic force that provides tactile information to a user making contact with the dielectric substance layer by applying an electric charge to the dielectric substance layer based on a driving voltage; and
ground areas, disposed amongst the electrodes, to ground the electric charge applied to the dielectric substance layer by the electrodes,
wherein the driving voltage is determined based on a texture of an object displayed at a position on a display at which the user makes contact when selecting from among images displayed by the display.

20. The apparatus of claim 19, wherein the electrodes control an intensity, an amplitude, and a duration of a vibration by changing an electrostatic force based on a frequency, an amplitude, and an input duration of a driving voltage.

21. The apparatus of claim 19, wherein the electrodes provide differing tactile information to the user based on a position at which the user makes contact with the dielectric substance layer by applying the electric charge to the dielectric substance layer based on a plurality of driving voltages corresponding to positions of electrodes.

22. The apparatus of claim 19, wherein the electrodes are disposed in a form of an array on a substrate.

23. The apparatus of claim 19, wherein the dielectric substance layer is composed of at least one selected from a group of:
strontium titanate ($SrTiO_3$), an $SrTiO_3$ compound, barium titanate ($BaTiO_3$), a $BaTiO_3$ compound, hafnium oxide ($HfO_2$), aluminum oxide ($Al_2O_3$), titanium dioxide ($TiO_2$), and zirconium dioxide ($ZrO_2$).

* * * * *